(12) United States Patent
Kwong et al.

(10) Patent No.: US 7,689,973 B2
(45) Date of Patent: Mar. 30, 2010

(54) LANGUAGE FOR DEVELOPMENT OF TEST HARNESS FILES

(75) Inventors: Man K. Kwong, Naperville, IL (US);
Roberta C. Kwong, Naperville, IL (US);
Lai-Cherng Suen, Naperville, IL (US);
Chen-Wan Wang, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1346 days.

(21) Appl. No.: 11/135,252

(22) Filed: May 23, 2005

(65) Prior Publication Data

US 2006/0265629 A1    Nov. 23, 2006

(51) Int. Cl.
*G06F 9/44* (2006.01)
*G06F 11/00* (2006.01)

(52) U.S. Cl. .................. 717/126; 717/115; 714/38

(58) Field of Classification Search .............. None
See application file for complete search history.

(56) References Cited

U.S. PATENT DOCUMENTS 6,047,389 A * 4/2000 Thai .......................... 714/38
6,301,701 B1 * 10/2001 Walker et al. .............. 717/125

* cited by examiner

*Primary Examiner*—Tuan Q Dam
*Assistant Examiner*—Hanh T Bui
(74) *Attorney, Agent, or Firm*—Carmen Patti Law Group, LLC

(57) ABSTRACT

A test harness development component streamlines the design of regression test harnesses for testing text-based software. An auto-recording tool to automatically record the input and output data in an actual run of the testing session and to automatically generate a test harness. The test harness development component provides an auto-executing tool to automatically run the test harness in subsequent regression tests. The test harness language is used to specify the tests, validation rules of the results, and any other rules for running the test of a test harness. The test harness language is human-readable and emulates the manual test procedures with very little overhead.

22 Claims, 12 Drawing Sheets

LANGUAGE FOR DEVELOPMENT OF TEST HARNESS FILES

TECHNICAL FIELD

The invention relates generally to software testing and more particularly to the automated testing of non-graphical software.

BACKGROUND

Software testing, which verifies and documents that a piece of software is operating correctly, is an important component of software development, and is often the most costly part of the process. With software testing, a software developer or software tester, oftentimes a specialist member of the software development team, proves that the finished program or software product meets its design requirements, and will function satisfactorily when released for practical operation. At various stages during the coding of a software product or, more likely, a portion of a large software project (and especially when the coding is declared complete for the first time), a developer often stops to perform unit testing to check to make sure that the product is working as designed. Many of the same tests will be repeated at various stages of development and new tests will be added from time to time.

After the developer is satisfied with the finished software product, it is first turned over to feature testers who will run a set of tests often related only to the newly written parts of the software product, to confirm the developer's claim that the finished product is working exactly as stipulated by the requirements. Then, integration or system testers will run a much larger set of tests involving the entire software product to make sure that other pre-existing features of the software are still functioning properly as they did before, and that the old and new features work properly with each other. This larger set of tests is often compiled by adding the most important tests from feature testing to the previous set of system tests. This growing set of system tests is sometimes referred to as a collection of regression tests. As bugs are found, the developer will fix them to produce a new software version and the same set of regression tests will be repeated many times over.

Regression testing is a well-known verification technique that involves continuously re-testing the design throughout modification and implementation to ensure that program errors are corrected and that design modifications or features added to the program do not introduce new errors. In carrying out regression testing the same tests are repeated to ensure that the behavior of the program being tested remains unchanged. Typically, the results of the various regression tests simply indicate whether or not the tests pass or fail. At times, the program being tested is a smaller portion of the overall program project. Accordingly, the regression tests may have to include an initialization step to simulate the environment of the program under actual operating conditions. As time goes on, and the program being tested undergoes a number of modifications, initialization and updating of the regression tests can require substantial investment. Oftentimes, regression testing is one of the most expensive and critical aspects of software maintenance, and improvements in testing such as test automation are being sought to help control program development and maintenance costs.

One of the most effective automatic tools is an automatic regression test harness in which regression tests are executed in a defined sequence, generating supporting documentation that a software program meets its stated requirements. A test harness comprises a collection of tests designed to verify proper behavior of a program. A test establishes an environment for the program, invokes one or more portions of the program, and compares one or more results of the program to one or more expected results for the program. The one or more expected results may be hard-coded into the test, for automated execution at a later date. As one shortcoming, the expected results for the program must be known when designing the test. It is desirable for the test harness to be developed independently from the determination of the expected results. Improvements in the reduction of user development time are still being sought.

Automated test harnesses are typically written in one of the popular scripting languages, such as ksh, perl, or python. Lengthy sessions of complicated programming are typically required. Code has to be written to perform one or more of the following steps: emulating the test developer's input or other initialization procedures, recording or otherwise capturing the output resulting from execution of the test developer's commands, comparing the test run output to some objective or standardized answers, and tabulating the results of the tests and with an indication of whether or not the tests were successful. At times, it is desirable to add new tests to an existing test harness. As with other newly written code, the new tests need to be verified for accuracy and reliability. In several examples of commercial testing software, a high level model of the software is created. Essentially, this requires a time-consuming effort of skilled professionals and accordingly is obtained only at a substantial cost. Once the model is created and debugged, a template of the code for the software and a test harness can be generated. However, much of the software developed for commercial purposes does not lend itself to such an approach.

Even after software is developed, tested and approved, modifications such as adjustments to the program require corresponding modifications to the test harness. For example, a test designer spends time manually computing new expected results based on the adjustments to the program. The test designer must then manually update the expected values of the tests of the test harness with the new expected results. For example, the test designer must hard-code the new results into the test, which adds additional lines of code, increasing a margin of error for the test harness as well as increasing difficulty of debugging the test harness. Modifications to the software undergoing testing may also require substantial modifications to the tests of the test harness. Once new or modified test harnesses are developed, they must be debugged and approved after having proven that they can operate with a measure of confidence and reliability.

A need exists for providing a reduction in labor and other costly investments required to develop, operate and thereafter maintain intricate special-purpose test harnesses over the useful life of the software being supported.

SUMMARY

The invention in one implementation encompasses a method. The method comprises the steps of defining and writing a series of statements comprising a test harness file for the automated regression testing of non-graphical software. One of the series of statements requests text string data representing a user-given name for a test in the test harness file, and another requests text string data representing test data of the non-graphical software. Another of the series of statements comprises a non-interactive operating system command comprising a test of the test harness file. A further statement comprises an interactive operating system command used as a test of the test harness file followed by a prompt pattern used by the interactive operating system command, while another of the series of statements comprises user input within the interactive operating system command.

Another implementation of the invention encompasses a method. The method includes defining and writing a series of statements comprising a test harness file for the automated regression testing of non-graphical software. One of the series of statements comprises requesting text string data representing a user-given name for a test in the test harness file and another statement comprises entering text string data representing test data of the non-graphical software. Another of the series of statements comprises a non-interactive operating system command comprising a test of the test harness file and a further statement comprises an interactive operating system command used as a test of the test harness file followed by a prompt pattern used by the interactive operating system command. A further statement comprises user input within the interactive operating system command. Another statement comprises a definition of a filter statement that alters the output of a preceding command; and comparing the output of a preceding command to a benchmark value.

Yet another implementation of the invention encompasses a method. The method includes defining and writing a series of statements comprising a test harness file for the automated regression testing of non-graphical software. One of the series of statements requests text string data representing a user-given name for a test in the test harness file, while another of the series of statements calls for entering text string data representing test data of the non-graphical software. Another of the series of statements comprises a non-interactive operating system command comprising a test of the test harness file, while another statement comprises an interactive operating system command used as a test of the test harness file followed by a prompt pattern used by the interactive operating system command. A further statement comprises user input within the interactive operating system command. Another statement comprises a definition of a filter statement that alters at least a part of the output of a preceding command; and at least one of the series of statements comprises an indication that the output of either the preceding command or all subsequent commands are to be compared to determine if the command passes or not.

DESCRIPTION OF THE DRAWINGS

Features of exemplary implementations of the invention will become apparent from the description, the claims, and the accompanying drawings in which:

DETAILED DESCRIPTION

As large software projects are developed, and later, as the software projects are updated, new code is introduced to add new functionality. Quality control and product certification, for example, require that the added functionality be tested, and that previously tested functionality be re-tested to assure that no new modifications have corrupted or otherwise caused the overall software project to regress. Regression testing is a well-known verification technique that involves continuously running the same set of tests, i.e. the test harness, over and over to ensure that the design's behavior has not degraded.

The term "test harness" as used herein, refers generally to some kind of practical implementation of a collection of tests. It can simply refer to a written record of the tests to be run and the details of how each test should be run. In one example, a test harness is associated with a tool that can automatically or semi-automatically run all the tests of the test harness with minimal intervention by a user, sometimes referred to herein as a test developer or tester, with the outcome of the tests preferably being tracked in some manner at the conclusion of the test process. Such an automatic test harness is obviously useful for all categories of software testing (e.g. unit, feature, and integration testing).

Overview

Figure 1:
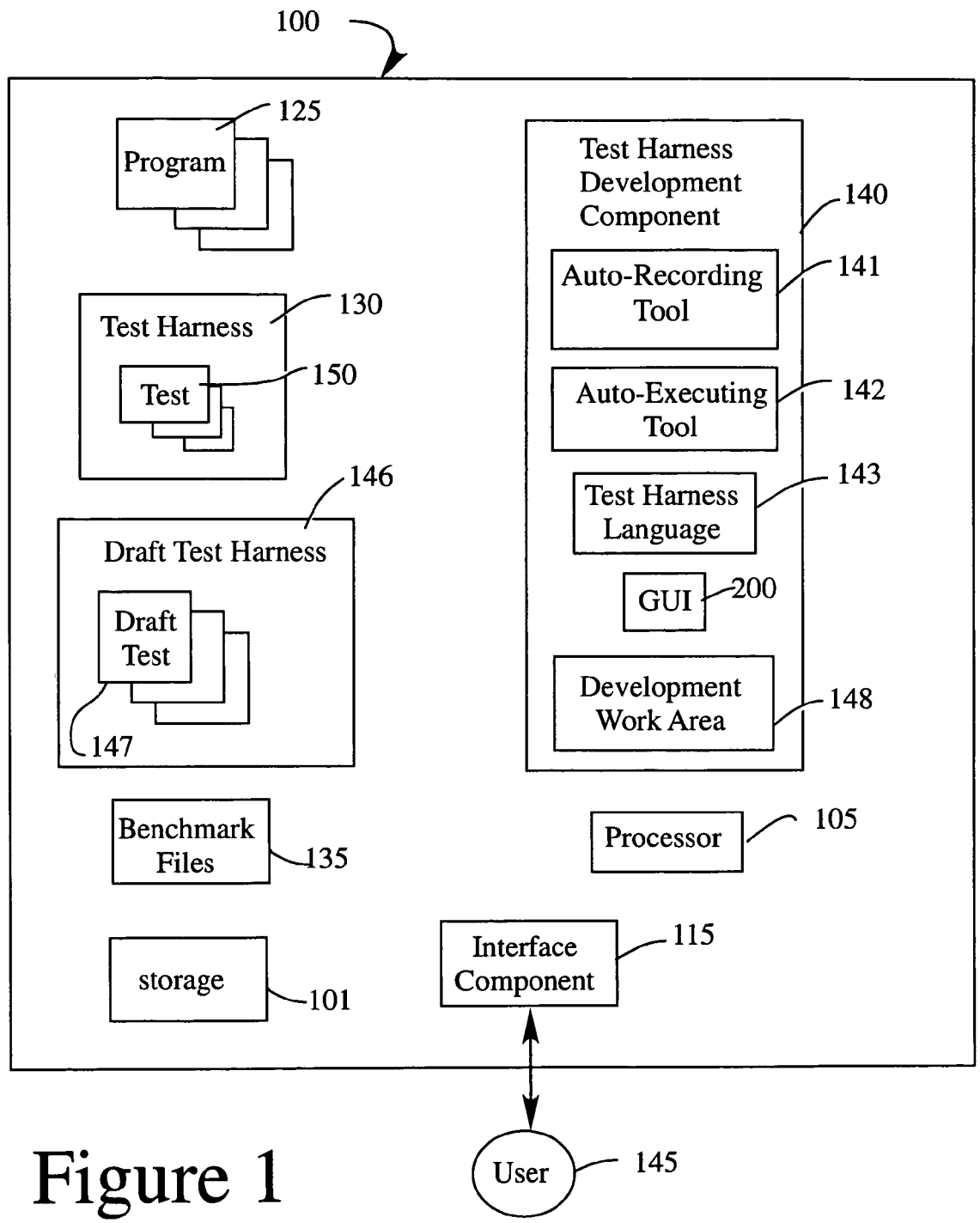
FIG. 1 is a representation of one implementation of an apparatus that comprises one or more storage devices, one or more processors, one or more interface components, one or more programs being tested, one or more test harnesses, one or more draft test harnesses, one or more benchmark files, one or more development work areas and one or more test harness development components.

By way of a brief overview, and with reference to FIG. 1, an apparatus 100 in one example comprises one or more storage devices 101, one or more processors 105, and one or more interface components 115. The interface component 115 may comprise input/output resources such as a known display, keyboard, mouse or other pointing device. The interface component 115 may also comprise a command line interface, but preferably either comprises or invokes a graphical user interface ("GUI") such as the GUI tool 200 shown in FIG. 2, and described below. In one example, GUI tool 200 is part of the test harness development component 140. In another example, the GUI tool 200 instead comprises all or a portion of interface component 115 represented in FIG. 1. The processor 105 in one example comprises a central processor unit ("CPU"). The processor 105 executes one or more instructions of one or more programs 125, one or more test harnesses 130, and a test harness development component 140.

Further, by way of brief overview, an auto-recording tool 141, in one example, is provided as a portion of the test harness development component 140. The design of regression test harnesses for testing text-based software is made more efficient by providing an ability to capture the test developer's input of a manual testing session, automatically generating test harness data from a stream of preliminary work carried out in a development work area 148. For example, the development work area 148 may comprise an area of memory assigned to the auto-recording tool 141. The auto-recording tool 141 in another example automatically records the input and output data in a run of newly finalized tests, to verify that the tests perform adequately. When desired, the user can invoke a portion of the auto-recording tool to automatically generate a new test harness. In another example, test harness development component 140 provides an auto-executing tool 142 to automatically run the test harness in subsequent regression tests, and to provide other useful advantages.

As will be seen herein, the development work area 148 contains an ongoing stream of the developers notes, commands or statements such as automated regression test harness commands, initialization trials and other input the developer may enter when exploring regression testing, prior to final coding of the test harness. Draft test harnesses 146 may be stored with one or more tests, including draft tests 147, for further development. Tools of the test harness development component 140, such as the auto-recording tool 141 and/or the auto-executing tool 142 may employ the test harness language resource 143. In another example, the portions of the test harness development component 140 may employ a known scripting language such as ksh, perl, python, or other known computer language suitable for the purpose.

The programs 125 undergoing testing in one example, comprise one or more text-based languages. In another example, the programs 125 are non-graphical as will be understood by those skilled in the art. The storage device 101 in one example comprises an instance of a recordable data storage medium, as described herein. In one example the storage device 101 stores the programs 125, the test harnesses 130, the draft test harnesses 146, one or more benchmark files 135, and one or more test harness development components 140. The storage device 101, in another example, also stores the development work area 148, where the user conducts preliminary tests and other experimental investigations, and can verify specific features of the software being tested, prior to creation of a formal regression test and/or test harness.

In one example, the interface component 115 is employed to invoke auto-recording tool 141 to run newly defined tests and/or to automatically generate new tests from commands and other pertinent information inputted to the system during trial runs and other preliminary investigations, which are preferably carried out in the development work area 148. In another example, interface component 115 is employed to invoke auto-executing tool 142, allowing a user 145 to execute one or more of the test harnesses 130 on the programs 125 and in one instance, to benchmark one or more tests 150 of the test harness 140 associated with the program 125. In a further example, the interface component 115 can be employed to invoke either the auto-recording tool 141 or the auto-executing tool 142, allowing the user 145 to verify one or more results of the program 125. The auto-executing tool can be invoked as a standalone resource, or it can be invoked through the auto-recording tool.

The test harness 130 comprises one or more tests 150 used to verify one or more current results of the program 125. The test harness 130 in one example establishes a testing environment comprising, in one example, initialization settings for the program 125. The test harness 130 employs the tests 150 to invoke the program 125 to obtain the current results In one example, the benchmark files 135 are preferably automatically created during operation of the auto-executing tool 142. In one example, the benchmark files 135 comprise one or more expected results for the program 125 during execution of one or more tests of the test harness 130. The benchmark files 135 in one example comprise one or more portions of the one or more tests 150. In another example, each portion of the benchmark files 135 comprises one or more accepted results obtained by the test 150. The benchmark files 135 in another example comprise one or more snapshots of expected behavior for the program 125. The benchmark files 135 enable validation in regression testing of the program 125, as will be understood by those skilled in the art.

By way of overview, and before proceeding with a detailed explanation of the various components of the test harness development apparatus, a typical procedure carried out by a user in developing a test harness will be presented. During an experimental phase, a user may review pre-existing test and experiment with new test commands. Usually, in a software program modification scenario, a user will run an established test harness without any special options, such as auto-dating. Old and established tests usually have already been benchmarked and so, only test results for the new tests are shown in full. But if the results of one or more of the new tests are incorrect, necessary corrections are made either to the tests themselves or to the software program being tested. The test harnesses are rerun until all of the test output appears to be satisfactory. The test harness is run again with the auto-benchmarking option, to add new test data to the benchmark file. The processes are repeated with additional tests having modified or new test commands. During testing software development, careful control over the number of changes in play at a given time is exercised. Also, careful documentation during modification and testing yielding surprising results is important. In one example, according to certain features of the test harness development apparatus, potentially useful commands and statements explored by a user are recorded and made readily available to the user, with little effort on the user's part. Oftentimes, such careful recording of potentially useful commands and statements can save a substantial amount of user time and effort. Examples of these types of advantages are described throughout, especially with reference to the Graphical User Interface tool represented in FIG. 2.

Graphical User Interface Tool

Figure 2:
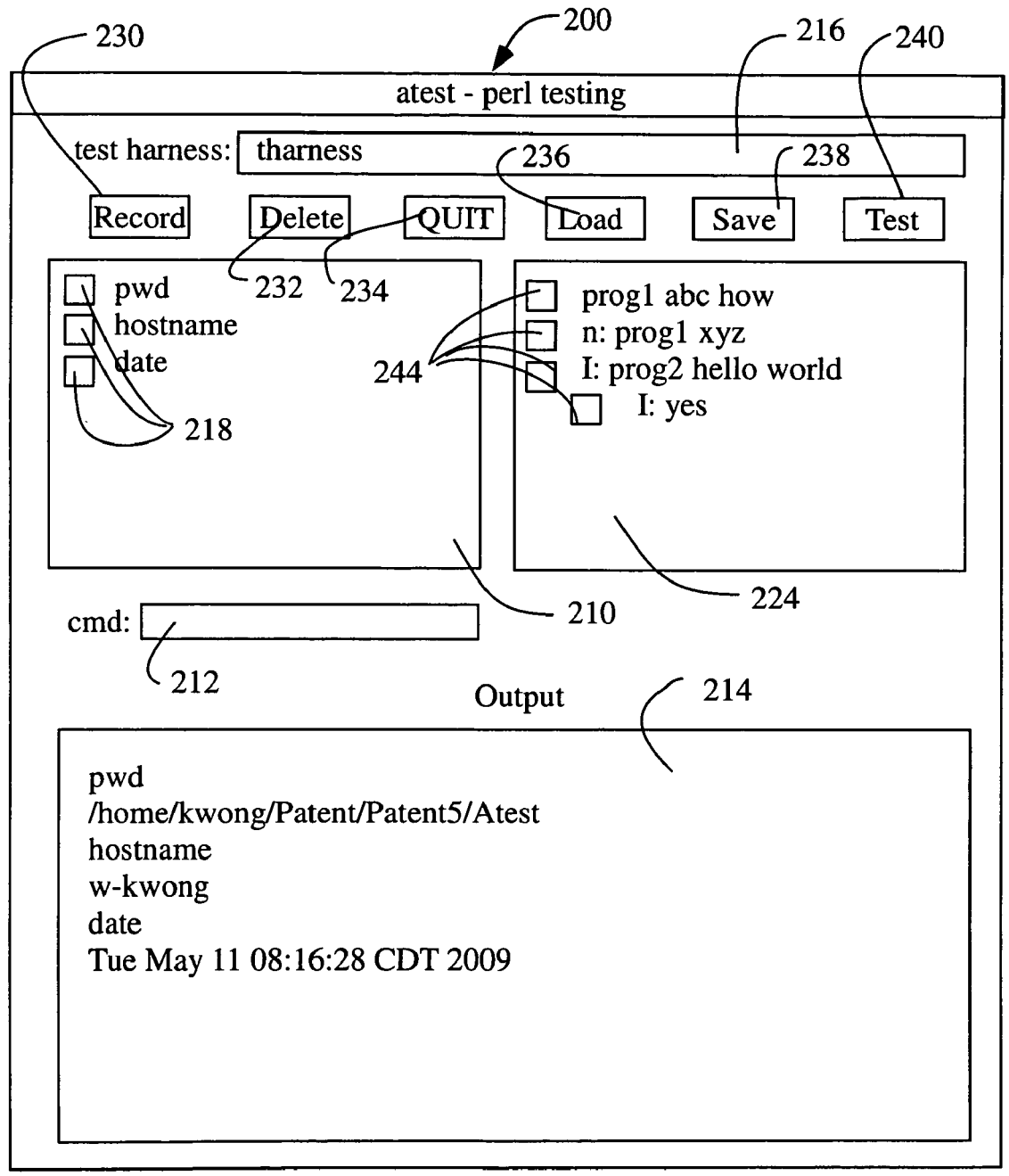
FIG. 2 is a representation of a graphical user interface for developing and/or testing a test harness.

The GUI (Graphical User Interface) tool 200 will now be described in greater detail. In one example, the Auto-Recording tool 141 is incorporated as part of the GUI tool 200, a representation of which is shown in FIG. 2. This auto-recording tool helps the test developer create, modify, and benchmark a test harness. FIG. 2 shows the GUI interface 200 (in the form of a window displayed in a workstation) in action. In one example, a user can bring up this interface by simply typing the command "atest" after an operating system prompt to invoke the last-used harness file, or typing the command "atest TEST_HARNESS_FILE" to use the named file.

At the top of the window represented in FIG. 2 is a text entry window 216 where a user can specify the name of a test harness file. Below that are six buttons 230-240. The "Record" button 230 is used to record selected commands in the left panel 210 below . The recorded commands will appear at the bottom of the right panel 224 below. The "Delete" button 232 deletes all the commands in the left command panel. The "QUIT" button 234 quits the GUI tool 200.

The "Load" button 236 reads or loads without user intervention the commands or automatic regression tests of the test harness file specified in the text entry above, to the right command panel 224. The Save button 238 saves the commands in the right panel 224 to the test harness file.

The "Test" button 240 auto-executes the saved tests in the test harness automatically, without user intervention. Note that in this case the output will not be displayed in the GUI, but in the original window where the GUI is invoked. Right-clicking the Test button will execute the test harness with auto-benchmarking.

The two panels 210, 224 below the row of buttons contain commands, otherwise referred to as statements of automatic regression tests. The left hand panel 210, called the Record Panel, contains commands that the tester has executed so far (by typing into the cmd text entry window 212 below the panel). A checkbox 218 appears to the left of each command. By clicking on the checkbox 218, a tester can select commands to be saved to the right panel 224 (by clicking the "Record" button 230 after finishing selecting the command). If the Record Panel 216 is cluttered with too many commands, the tester can click the "Delete" button above to delete all the commands. The right panel 224, called the Playback Panel, initially contains all the commands in the test harness file specified to be read via the "Load" button 226. As testing proceeds, new commands can be recorded, and copied over so as to be appended to the end of the panel. Note that newly added commands will not be saved to the test harness file until the "Save" button 238 is clicked. To the left of each command in the playback panel 224 is a button 244 with no label. In one example, a color of these command buttons 244 is used to indicate the type of the command. A pink button, for example, may be used to indicate a non-interactive command. A green button, for example, may be used to indicate an interactive command, while a cyan button may be used to indicate one of the other commands in the test harness language of resource 143. In one example, left-clicking one of these buttons 244 will execute the test command, and the test output will be displayed in the text area or output panel 214, below. In another example, right-clicking one of these buttons 244 will copy the command to the cmd text entry window 212. This is a convenient way to recall a previous command, make some changes, and then execute the modified command, and evaluate the results.

The cmd text entry window 212 provides an area where the tester or user can type in various commands or other input during the experimental phase in the test harness development. Alternatively, the tester can right-click on any command in the Playback Panel 224 to recall an earlier command to the cmd text entry window 212. Typing a <RETURN> in the cmd text entry window executes the command. The command will appear in red in the Output panel below and the output from the command will appear in black. In addition, the command will appear as a new entry in the Record Panel 210.

In one example, the GUI tool 200 employs short-cut keys:
Alt-a records the last command executed.
Alt-d deletes all commands in the Record panel.
Alt-n toggles the last recorded command with n:.
Alt-r records the selected commands in the Record panel to the Playback panel.
Alt-s saves the recorded commands to the test harness.
Alt-U deletes the last recorded command from the Playback panel. This provides some limited capability to edit a test harness file. The most convenient way to revise the harness file is to edit it directly using an ordinary text editor.

The GUI tool 200 can be used in the earliest stages of test harness development, starting with an initial phase of trying out prospective tests to be included in the harness. As the tester's input commands are typed, they are remembered by the tool and can be selectively recorded and processed to generate a test harness file. The left hand panel 210, or Record Panel, contains commands that the tester has previously executed, by typing into the cmd text entry window 212. Input commands are entered in this window 212 when the user conducts preliminary experiments with prospective tests. Each command is executed as if it had been typed normally on a computer terminal, and the subsequent output is printed in the output area 214 located below the command input area 212. Each command is also remembered by the graphical user interface tool and appears in the upper portion of left hand panel 210, along with a checkbox 218. When a user is satisfied with a test, the corresponding commands used for the test can be selected by clicking on the checkbox 218 is next to each command item. After clicking the "Record" button 230, the selected commands appear in the adjacent right hand Playback panel 224. These commands, along with other program statements are automatically generated from the user's inputted data stream. As mentioned, each of the recorded (i.e. processed and stored) commands preferably has an adjacent button 244 which is coded, by color, to represent various categories of statements employed in the test harness language resource 143. In one example, the development work area 148 represented in FIG. 1 comprises the panels 210, 214, 224 and the windows 212, 216 represented in FIG. 2. As will be appreciated, the auto-recording tool aids the user in defining and writing a series of statements comprising a test harness file for the automated regression testing of non-graphical software.

When the experiment is finished and all of the series of commands or statements in all of the series of tests have been recorded, the "Save" button 230 is used to generate a test harness file with a name specified by the user. If desired, the GUI tool 200 can be invoked by specifying an existing test harness file so that new tests or other modifications can be added to it. The "Test" button 240 can be clicked to auto-execute and/or benchmark all the commands of all the tests in the test harness file. Alternatively, the button 244 next to each command appearing in right hand panel 224 can be left-clicked to re-execute the particular command, or right-clicked to recall the command into the cmd input entry window 212 so that the user can perform modifications to form a new command.

In one example, the GUI tool 200 is written in the perl language using the Tk module. The Tk module is a tool-kit library of perl functions providing the capabilities of constructing graphical objects, such as buttons, checkboxes, and text areas, used in the GUI tool.

Test Harness Language Resource

The test harness language or test harness language resource 143 represented in FIG. 1 is used to specify the tests, validation rules of the test results, and any other rules for employing the tests of a test harness. In the simplest of all cases, default validation rules are used and the test harness is simply a list of user commands. In one example, the test harness language resource is embodied in a set of commands which are sufficient to describe all of the activities in defining and writing a test harness. As will be appreciated, many of the capabilities of a language used in a general computer application are not required to develop test harness files. For instance, there is only one main data type dealt with in such testing, namely the output from a test command, in the format of a text string. In this example, the test harness language resource does not have to specify how the test results are to be stored, because the auto-executing tool will store the test results in the appropriate benchmark file automatically, without requiring user intervention. In another example of data types to be dealt with in the test harness language resource, the name of a test is specified in response to one of the statements of the test harness language resource. Thus, one example of a typical statement in a test harness file contains a request for text string data representing a user-given name for a test in the test harness file. This statement could, in the example given, be responsive to a call for information of a known data type, for example, the text string of a test or test harness file name. In another example, one of the series of statements in a test harness file can comprise entering string data representing test data of the non-graphical software being tested. In each of these examples, it can be seen that there are no contextual issues in interpreting the input or test result being processed.

Further, the test harness language resource is not burdened by software control issues present in general computer environments. Software testing, as is contemplated here, is always done under controlled and restricted environments. For example, each testing scenario is done under a carefully initialized environment, so as to minimize ambiguity. For these and other reasons, the tester or user rarely needs to use statements which control the flow of program execution. If, in relatively rare instances, the user should require some measure of program flow control, the test harness language resource includes a command directed to, for example, "any non-interactive UNIX command". The reference here is to UNIX commands in the UNIX shell language which, this is known, is a complete computer language containing flow controls and other types of control commands which the test harness language resource can use to handle more complex needs. In one example, the relatively small number of commands have been found to be sufficient for operation in a demanding commercial environment. If desired, the command can be referenced to a native operating system other than UNIX.

The test harness language 143 comprises a computer language that has its own vocabulary and grammar that are used to create a list of instructions that tell a computer system what to do. This test harness language provides a standardized communication technique for organizing the user's thoughts and for expressing these thoughts and as instructions to a computer. The test harness language resource comprises a set of syntactic and semantic rules used to define computer programs. The test harness language resource enables a programmer or user to precisely specify what data (in one example herein, textual data, exclusively) that a computer will act upon, how these data will be stored/transmitted, and precisely what actions to take under various circumstances. In one example, the auto-recording tool 141 uses the test harness language resource to create one or more tests and one or more test harnesses (test harness files).

By way of example and not limitation, the following statements are available in the test harness language resource. These statements, sometimes referred to herein as "commands" are passed to the software code of the auto-executing tool which interprets the statement and translates it into specific operating instructions. Details concerning the software code of the auto-executing tool needed to interpret and translate the statements described herein is not believed to be necessary for an understanding of the present invention. Rather, it is believed that one of ordinary skill in the art will be readily able to develop such software code without undue experimentation. As mentioned, a relatively small number of statements is presented herein. These statements have been found to satisfy the needs of commercial users engaged in a competitive environment. Additional statements may, of course, be added and such is contemplated by the present invention. These statements are operated upon by software code in the auto-execution tool 142. As mentioned, the auto-executing tool may be implemented in any of the number of known computer languages for use with any of a number of known operating systems (whether special-purpose, general-purpose or otherwise), on any of a number of known computer platforms.

Statement #1) # comments—A comment statement. A line that starts with the # symbol is a comment line used mainly for documentation purpose and will be ignored by the auto-executing tool. A line that starts with #BEGIN TEST can be used to mark the beginning of a test and a line that starts with #END TEST can be used to mark the end of a test.

Statement #2) Default non-interactive operating system command. By default, any non-interactive operating system command—A line that does not start with a colon modifier (namely a string with one or more characters followed by a colon) is interpreted to be a non-interactive Unix or other native operating system command. The auto-executing tool will execute the command at the native operating system level as if the tester had typed it directly into the terminal. Unless this statement is followed by an n: statement, the output of the command is used to determine if the test passes or not. By default, the entire output has to match the benchmark, character for character, to pass a test. The e:, F:, and f: statements below can be used to change this default criterion.

Statement #3) n:—A statement with preceding "n: ". If an operating system command statement is followed by a line with only n:, the output of the Unix statement is discarded and no matching is done. This is usually done if the purpose of the preceding Unix statement is merely for setting up the test environment and its output is not important as far as the software under testing is concerned.

Statement #4) n: any non-interactive Unix command—A statement of the form "n: operating system command" is just a more convenient alternative to the statement "operating system command" followed by "n:".

Statement #5) e: perl-style pattern matching—an Expect statement. An e: statement (mnemonic of expect) specifies a matching pattern (in the style of the perl language) used in the verification of the output of a preceding operating system command. This is used in the case when one is not concerned with the entire output of the previous command, but simply looking for the presence or absence of certain keywords. For example, "e: /success/i" specifies that the output contains the string "success" (in either upper or lower case), and "e: !/ERROR/" specifies that the output does not contain the string "ERROR" (this time it must be in upper case). The perl-style pattern matching capability uses the concept of extended regular expressions, and it is a very powerful means for constructing test verification criteria.

Statement #6) F: name/definition of a filter to be used by default—A Default Filter statement. An F: statement is used either to define a default filter or to select one that has already been defined earlier. In one example, a filter is a subroutine (written in the perl language) which, in some specified ways, alters the output of the preceding Unix command. Our invention provides a built-in filter called d2z, which converts the conventional Unix date/time format (e.g. Tue May 11 14:19: 38 CDT 2009) to a string of characters z. The purpose of filtering the output is to suppress any parts that can vary from one invocation of the command to another, if these parts do not affect the validity of the test. For example, some software prints a time-stamp, in the Unix date/time format, as part of its output. This time-stamp varies from one invocation of the software to another. If a user compares the output from two different invocations, they will never match. When a filter is specified, both output and the benchmarks are filtered before they are compared.

Statement #7) f: name/definition of a filter to be used once—A One-Time filter statement. An f: statement is used either to define a one-time filter or to select one that has already been defined earlier. This filter is used only for the preceding command. Subsequent commands will revert to using the default filter.

Statement #8) N: user-given name for the test—Name a statement for test harness file. An N: statement specifies a user-given name for the test involving the output of the preceding command. The test name will be displayed when the test harness is auto-executed and is used to remind the tester what the test is doing. The name is also useful if the tester has to refer to the particular test to a colleague.

Statement #9) p: prompt pattern within an interactive command—A string pattern statement. A p: statement specifies a string pattern (in the form a perl regular expression), which the tool will use to look for the prompt in an interactive software.

Statement #10) I: any interactive Unix command—An Interactive command statement. An I: statement specifies an interactive command that a user will normally type at the Unix prompt. The user will then expect to see the interactive prompt specified by the p: statement.

Statement #11) i: user input within an interactive command—An Input statement. An i: statement is a user's input, responding to the p: prompt within an interactive command.

Each test and a test harness is comprised of a list of test commands and each test is given a unique test name. The "N:" statement can therefore be used to indicate the end of a test. Hence, the list of all commands in a test harness file between consecutive statements of the form "N:" constitute a single test. In one example, in addition to this feature, a user is allowed to optionally insert a comment line to indicate the beginning and/or ending of a test. For example, a line that starts with "### BEGIN TEST" begins a test and one that begins with "### END TEST" ends a test.

A typical test in a test harness involves few or no operating system commands to be typed in before actually invoking the software being tested. Initialization commands are used to set the appropriate initial environment needed for proper functioning of the software undergoing test. Examples of initialization include setting some operating system environment variables, changing to an appropriate directory, and copying certain files. In one example, in practical applications, test commands that begin with "n:" which discard output from the test step offer one example of test initialization. But once such steps have been written into a test, the next time the test is run, the auto-executing tool will automatically carry out the indicated initialization steps.

The following presents an example of an abbreviated command set of the test harness language resource.
    # comments any non-interactive Unix command
    n: any non-interactive Unix command
    f: name/definition of a filter or pattern matching
    N: user given-name for the test
    p: prompt pattern within an interactive command
    I: any interactive Unix command
    i: user input within an interactive command
By comparison with the more complete command set given above, it will be observed that the "n: " type statements, and, likewise, the e: F: f: type statements, have respectively been combined to form a single statement type.

In one example, the information needed to realize and execute a test harness is recorded in an associated test harness file. Typically, with respect to FIG. 1, the name of the test harness file 130 describes and uniquely identifies the collection of regression tests 150. The harness information is written with the test harness language resource which is human-readable (i.e. in plain ascii format, editable by standard editors of known operating systems, such as the UNIX operating system). In one example, the test harness language resource is employed to emulate the manual test procedure with very little overhead. As a result, the test harness file is simple and easy to understand and easy to modify at a later time, when details of the overall project may be forgotten.

The test harness language resource 143 provides further advantages when auto-benchmarking is employed. In one example, the auto-executing tool 142 invokes an auto-benchmarking tool which is used to capture the output of the tests and to store them in a separate benchmark file 135. A user normally does not have to be concerned with the benchmark file 135. In another example, the auto-executing tool 142 is invoked to run a test harness file 130 with each statement of the file being interpreted and the appropriate action taken. Pass or failure of a test is usually verified, especially by comparing the output to known value, oftentimes the content of a benchmark file. Sometimes a tester or user may not be concerned with the entire output, but with only a part of the output. In other situations, verification of the test result may involve running other Unix commands, e.g. to check if some files have been properly generated, or to check if the content of some files have been properly modified.

When employed with auto-benchmarking, only user input is required to be coded in the test harness file. A user need not be concerned with running separate tests to generate benchmark results, or to normalize or otherwise initialize the test environment. After testing the software program 125, there may be additional commands to clean up the environment, e.g. to remove certain files. Occasionally, output from some of the non-essential commands may not be of importance, and a filtering tool is provided in the software to ignore unwanted data. The test harness language resource 143 is able to handle these steps in various situations.

The test harness language provides different statements to specify a variety of tasks. For example, the test harness language specifies input to invoke non-interactive operating system commands. By default, the output of a command is compared, matched or otherwise verified with reference to a benchmark value to determine pass or failure of a test. The test harness language resource also specifies a directive command to ignore the output of a command if that is appropriate.

The test harness language resource further comprises a statement to specify how the output is to be filtered, i.e. used in validating the test if exact matching to a benchmark is not necessary. Accordingly, a test harness file may include a user definition of a filter statement that alters the output of the preceding statement. The filter statement may define one more portions of an output to be suppressed, deleted, or otherwise ignored. The test harness language resource also specifies input to invoke interactive operating system software and to wait for the appropriate operating system prompt to continue. The test harness language resource also specifies suitable input when prompted inside an interactive software and waiting for the next appropriate prompt to continue. Also, the test harness language resource specifies a way to name a test and a way to optionally mark the beginning and the end of a test (so the auto-executing tool knows how to skip a test if so instructed).

Since the test harness file is written in plain ascii form and the language is simple, a developer can easily edit it using any text editor at any time, to: modify an existing test, add tests, add/modify test validation criteria, and/or add control statements. Thus, a series of test harness file modifications can be saved using unique, nonidentical names.

Auto-Recording Tool

As indicated above, in one example, the auto-recording tool 141 is part of the test harness development component 140. Generally, the auto-recording tool aids the user in developing individual commands, and tests as well as test harnesses. In one aspect, the auto-recording tool simplifies the user's task by incorporating expert features and by capturing the data input stream entered by the user. Writing a test harness in the traditional way is usually a time-consuming and tedious process. Before a test harness is created, the developer usually experiments with the software to determine a set of tests. During the experiment, prospective tests are tried out by manually typing in the commands and validating the outcome against the requirements and design of the software. A subset of these tests is recorded and later turned into a harness by creating a program (written in one example, in one of the popular scripting languages) that emulates the manual steps. As existing tests are modified or new tests are added to the program, the tests and test harnesses will have to be updated. The process of coding the test harness and updating it is often time-consuming, tedious, and error-prone.

In one example, the auto-recording tool 141 is used to capture the test developer's input of a manual testing session and to automatically generate a test harness file. This tool, in one example, can be provided with code to automatically test and optionally process (parse) the incoming data stream (which, in one example, resides in the development work area 148) for subsequent processing into command lines, initialization procedures and data to be used in testing the software. In another, and more preferred example, when a user types in a command or statement the auto-recording tool passes that command to the auto-executing tool which parses the command and carries out the instruction. In this latter example, the responsibility for parsing the user's input text stream is assigned to software code in the auto-executing tool, and not in the auto-recording tool.

Preferably, the auto-recording tool, in one example, generates tests and test harnesses using the test harness language resource 143. In one example, it is preferred that the user be constrained to follow the organization of test harness development procedures laid out in the test harness language resource. Further, as was seen above with respect to operation of the GUI tool 200, the user is presented only with command lines which have been passed through the auto-executing tool. The user's role at this point in the test harness development is to select commands or statements. It is these user-selected input commands which are recorded into the test harness file, almost verbatim. Accordingly, very little conversion is needed or performed. Thus, the test harness language resource greatly aids operation of the auto-recording tool during the experimental stage of the harness development process. Aspects of these and other procedures of the auto-recording tool were mentioned above with reference to the representation of the GUI tool 200 in FIG. 2.

The test developer or user inputs that are typed in while trying out prospective tests are remembered by the auto-recording tool 141, in one example, by using the development work area 148 for temporary storage and display to the user. The user is given the opportunity to further process and save user-selected portions of the ongoing data stream being generated. When the user determines that one of these prospective tests is suitable for inclusion in the test harness, the auto-recording tool 141 can be instructed to record the corresponding input commands. An example was given above with reference to the "Record" button 230 represented in FIG. 2. At the end of the input session, the auto-recording tool 141, in one example, automatically converts the selected tests into a test harness file, preferably written in the language of the test harness language resource 143. The auto-recording tool 141 essentially eliminates the most time-consuming part of coding the test harness, thus greatly speeding up the test harness development process. At a later date, if new tests have to be added, a user or test developer can just invoke the auto-recording tool again and specify the existing test harness file. After experimenting with new prospective tests, suitable tests can be recorded and appended to the test harness file.

The auto-recording tool 141, in one example, comprises UNIX shell software, although other known operating systems may be used. The auto-recording tool 141, along with one or more other parts of test control component 140, provides for a reduction in the time required by the user 145 to develop a test harness, for example, the test harness 130, for a program, such as the program 125. The auto-recording tool 141 in one example comprises one or more data types. In one example, the data is limited to a single textual type. The auto-recording tool 141 may run the tests itself or invoke the auto-executing tool to run the tests. The auto-recording tool 141 opens an output file generated by the tests in the harness file, reads the content of the output file, closes the output file, and carries out benchmarking if appropriate. The auto-recording tool 141 in one example captures one or more messages printed to the interface component 115 by the tests in the harness file.

In one example, the auto-recording tool includes a filter tool to further automate development of the test harness. In one example, the filter tool of the auto-recording tool 141 includes a filter which comprises a date removal subroutine. The date removal subroutine in one example replaces one or more date-formatted strings with 'z' characters. The date removal subroutine is usefull in situations where the results will be different for every invocation of the test 150. For example, results stored with a timestamp will vary for each invocation of the test 150 and it is thus appropriate in many instances to suppress the timestamp portion of the output. In another example of filtering unwanted test results, many computers and commercial equipment used today have a unique, identifying machine name. There are many known examples of software that include the machine name as part of the displayed message. Accordingly, the command output, or test results of test commands are slightly different if the test is done on one computer or another. In order to make it possible to benchmark the result done on one computer and use that to validate the result done on a different computer, a filter can be written to mask out or otherwise suppress the machine name in the output message.

In another example of filtering unwanted information, some software prints out its own name and current version number in an output message. If the benchmark file is to be used for all future versions or releases of the same software, the version number in the output message should be filtered out, for a more general application, and to avoid presenting surprising results to future users, unfamiliar with the program history.

Referring back to FIG. 1, the auto-recording tool 141 receives one or more command arguments from the user 145 via the interface component 115. The command arguments in one example comprise one or more execution command arguments, one or more benchmark command arguments, and one or more forcemark command arguments. The auto-recording tool 141 provides one or more results of the program 125 to the user 145 through employment of the interface component 115. The auto-recording tool 141 employs the interface component 115 to obtain verification of the results of the program 125. For example, the GUI tool 200 can comprise a text box for a result of the program 125. The GUI tool can further comprise an "Accept" button and a "Decline" button. The result is displayed to the user via the interface component 115. The user 145 presses the "Accept" button to verify the result. The user 145 presses the "Decline" button to reject the result.

In one example, the programs 125 comprise non-graphical, text-based software, of either the non-interactive or the interactive type. With non-interactive software, a user types the appropriate command together with any options and arguments, after the operating system command prompt. Output from the command will then be displayed on the screen and the operating system command prompt appears again. With non-interactive software, it is easy to know when the software has finished its work, or equivalently, when the computer is waiting for the next command. With interactive software, the user's first input is similar to that of non-interactive software. However the operating system command prompt will not return immediately. Instead, a different prompt, specific to the operating system software will be displayed. The operating system software may be asking the user a question (such as, whether to continue or not), or prompting the user to choose an item from a menu, or simply waiting for the next command.

One difficulty in automating interactive software is to know exactly when the program output has ended (namely, the software prompt has been displayed, and hence, user input is needed). For instance, an interactive program may first print a line, then it may hesitate a little due to sluggishness in processing before printing the prompt. Although it is preferable to conduct fully automated execution, a test developer's intervention is often needed to provide the format of the expected prompt when writing the test harness. If a test developer does not specify the prompt format, the auto-recording tool 141 will do its best by simply waiting a predefined reasonable time period.

As mentioned above, the auto-executing tool 142 is also provided as part of the test harness development component 140. It will be noted that certain features overlap between the various parts of the test harness development component 40, such as the auto-recording tool and the auto-executing tool. For example, both tools can perform optional automatic benchmarking, if this is provided. In another example, automatic benchmarking capabilities can be incorporated into each tool, or if desired, automatic benchmarking routines can be provided as a common resource of the test harness development component 40, apart from other tools, and accessed by appropriate calls within the tools.

Figure 3:
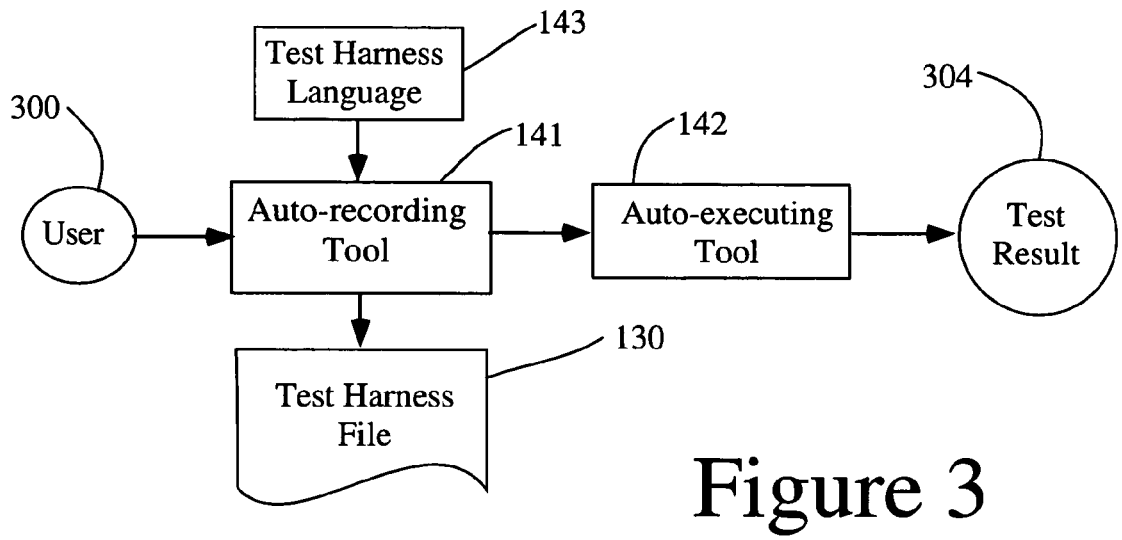
FIG. 3 is an exemplary process flow of the operation of the apparatus of FIG. 1.

An illustrative description of exemplary operation of the auto-recording tool 141 is presented, for explanatory purposes, with reference to FIG. 3. A user 300 interacts with the auto-recording tool 141 which automatically records the user's keystrokes while the user experiments with various test scenarios. The flow of information is recorded for possible future use in a test harness file. Portions of this flow of information comprise test commands which, if proven and verified can comprise candidates for one or more tests in a test harness file. Accordingly, the test harness development component 40, in one example provides capability of preliminarily testing commands in an experimental environment. The commands are passed by the auto-recording tool 141 to the auto-executing tool 142, which parses the commands, executes the commands, captures results of the tests and displays the test results 304, either directly or, more preferably, by passing the test results to the auto-recording tool 141 which records the information for possible future use and displays information to the user for evaluation. The user 300 is free at any time to select one or more commands from the dataflow, for recording as part of a test of a test harness file 130. In one example, the auto-recording tool 141 records the command in the format of the test harness/activity language or test harness language resource 143.

Figure 4:
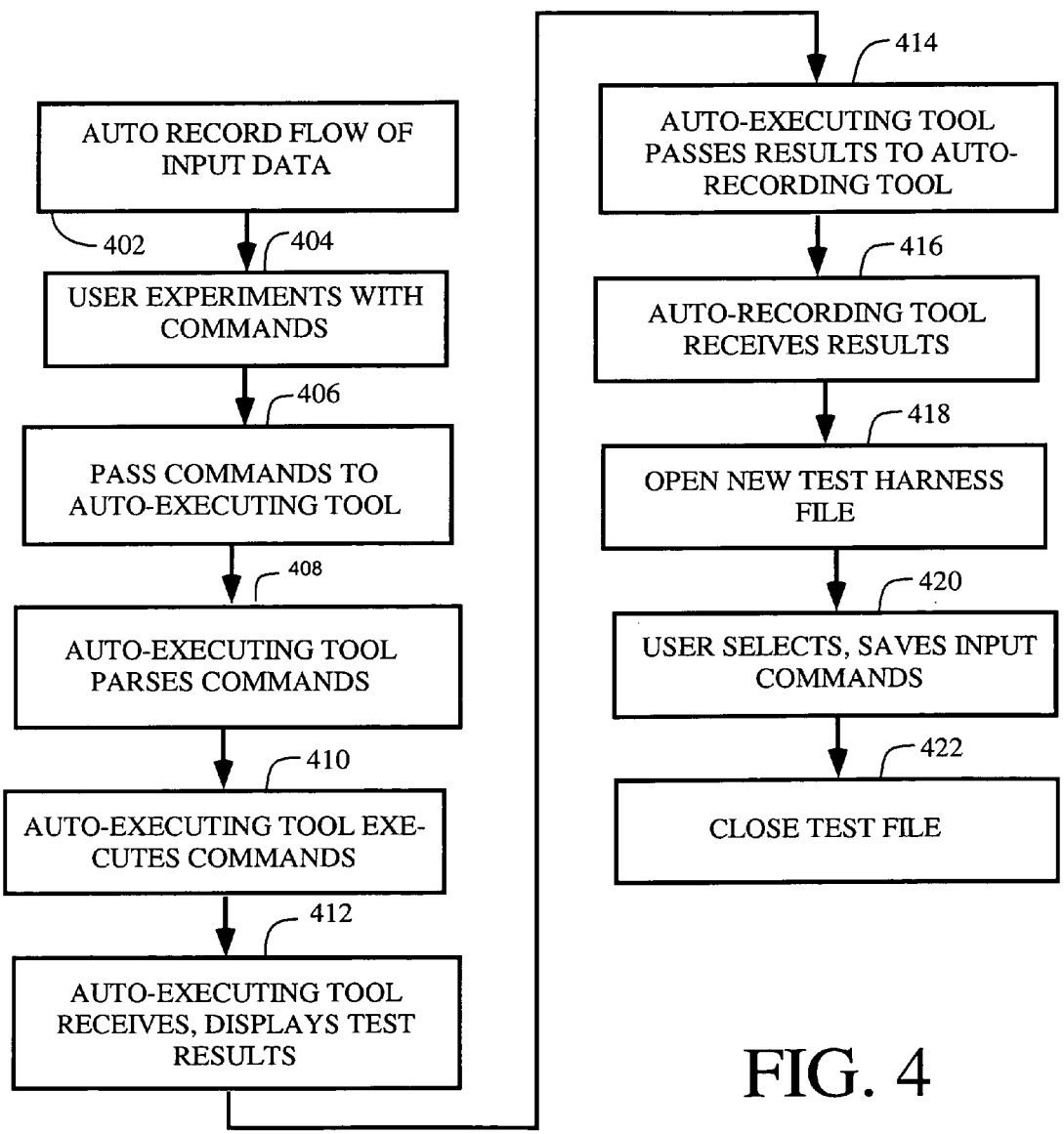
FIG. 4 is an exemplary process flow of the auto-recording tool of the apparatus of FIG. 1.

With additional reference to FIG. 4, operation of the auto-recording tool begins in step 402 by automatically recording the input dataflow. In one example, as comprises an ongoing stream of data temporarily retained in a work area, originating from a number of possible sources, including keyboard input, data passed from the auto-executing tool (e.g. test results of experimental commands), and the contents of a test harness file which are loaded into the work area of the auto-recording tool. In step 404 the user experiments with commands appearing in the work area. In step 406 the commands are passed to the auto-executing tool 142 which parses the commands in step 408 and executes the commands in step 410. In step 412 the auto-executing tool receives the test results and passes the results to the auto-recording tool in step 414. The test results are received by the auto-recording tool in step 416 and displayed for user evaluation. Assuming the user is satisfied with the performance of the command, a test file, new or existing is opened in step 418. In step 420 the user selects the commands and instructs the auto-recording tool to save the selected commands. When all of the desired commands for a test, and all of the desired tests are saved to the file, the file is then closed in step 422.

Figure 5:
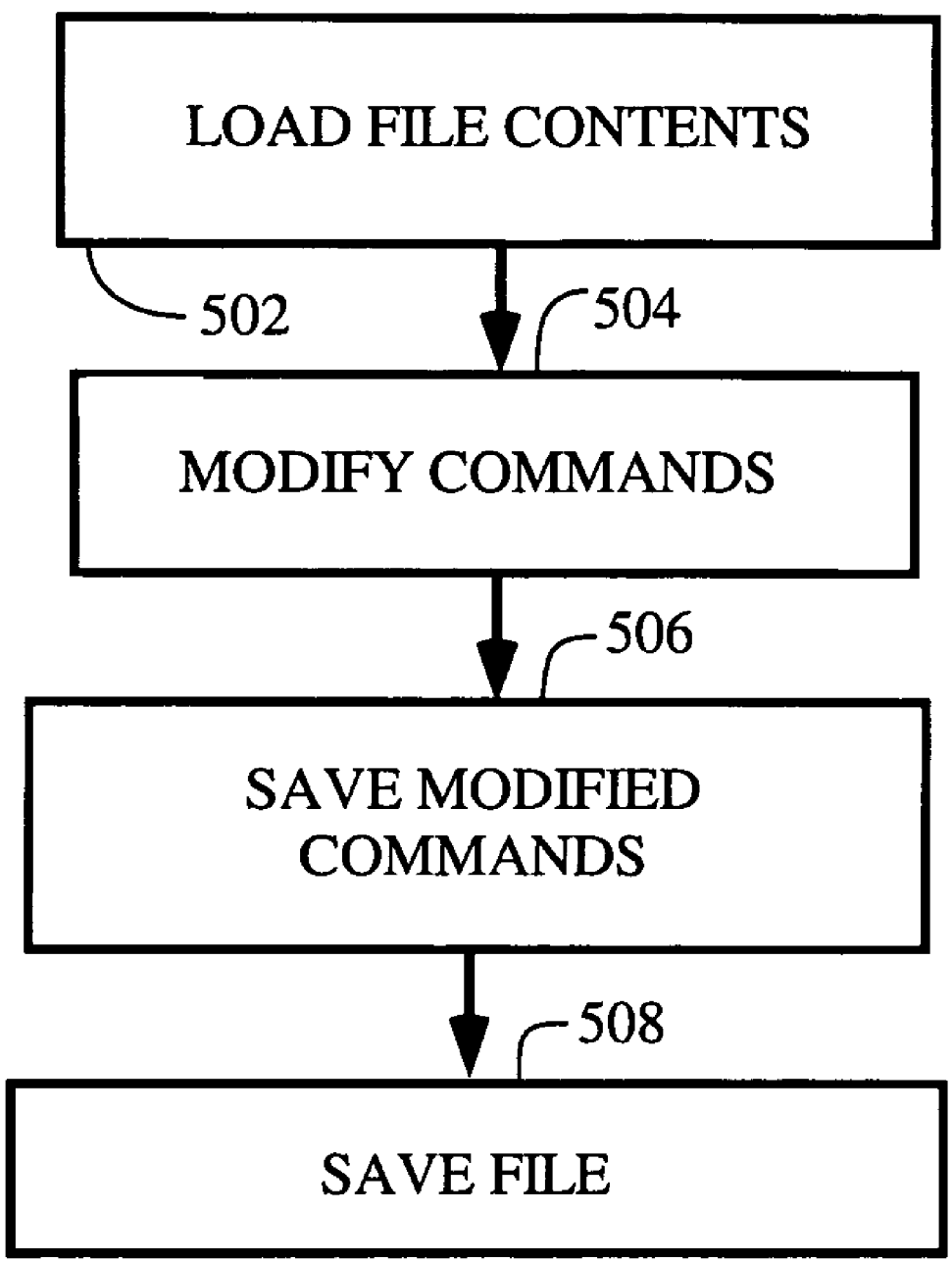
FIG. 5 is an exemplary process flow of directly editing a test harness file in the auto-recording tool of FIG. 1.

With reference to FIGS. 3 and 5, a user may directly edit a test harness file 130. In step 502 the content of the test harness file is loaded into the auto-recording tool 141. In one example, the content comprises one or more tests commands formatted according to the test harness language resource 143. In step 504 the commands are modified and in step 506 the modified commands are saved and the modified test harness file is closed in step 508.

Figure 6:
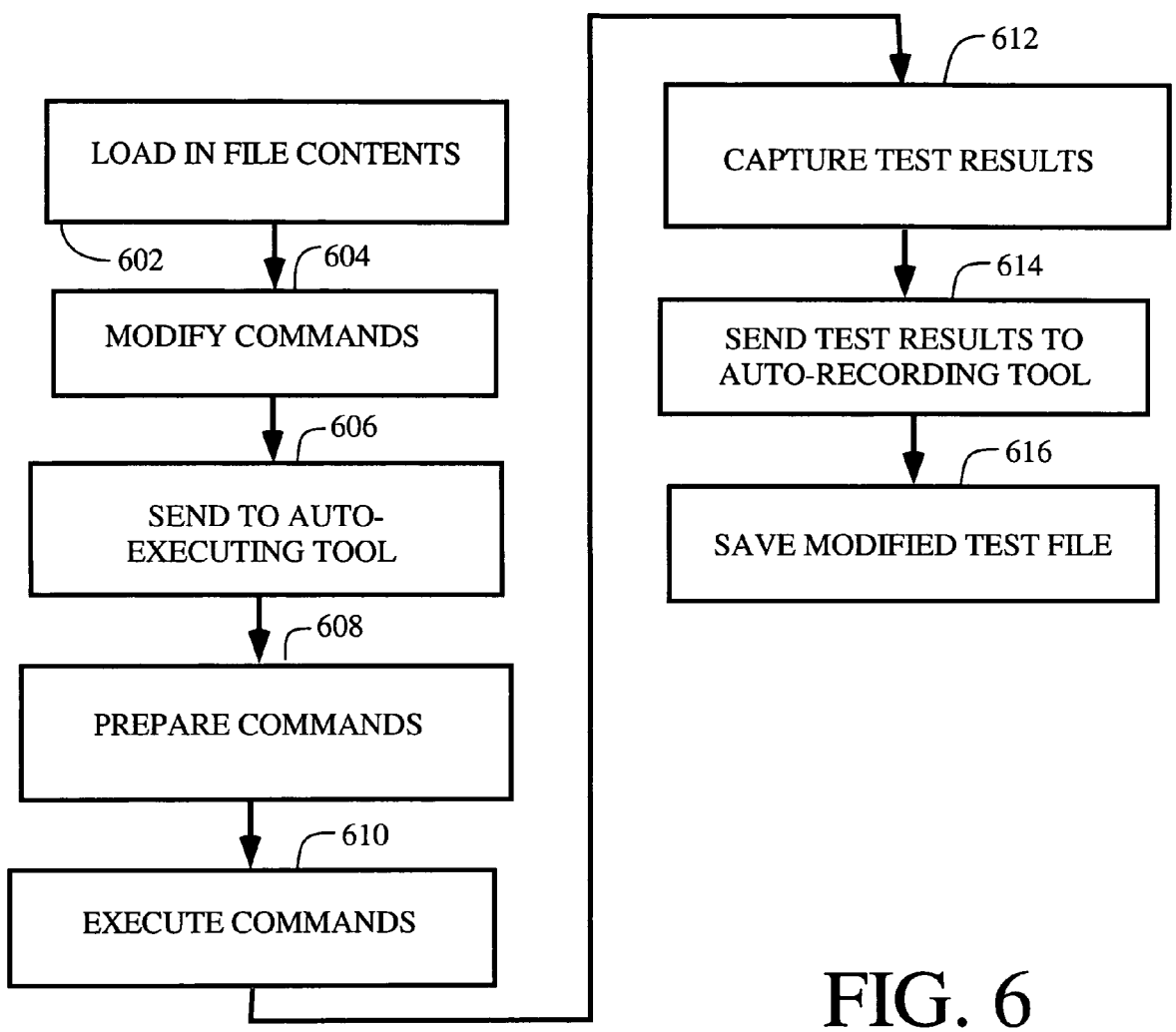
FIG. 6 is an exemplary process flow of modifying a test harness file in the auto-recording tool of FIG. 1.

Referring now to FIG. 6, existing test harness files 130 can be readily modified in the auto-recording tool 141. In step 600 the contents of the file are loaded into memory 602 allocated to auto-recording tool 141. In one example, the contents of the file are loaded into development work area 148 shown in FIG. 1. In step 604 the commands are modified, as desired by the user. At this point, the user could save the commands to either a modified test harness file, or a newly named test harness file, according to the method steps represented in FIG. 5. However, the user may wish to confirm that the modifications do not cause unforeseen complications. In one example, the commands representing a complete test (that is, both the modified and modified commands) are formatted according to the test harness language resource 143, and are ready for execution upon command. In step 606 the commands are sent to the auto-executing tool 142, and are prepared 608 for execution by the code of the auto-executing tool. In step 610 the commands are executed and the test results are captured in step 612. In step 614 the test results are sent to the auto-recording tool, for user analysis. If the user is satisfied with the performance of the modified test file, the test file is saved in step 616. In the example given, the experimental execution of the file commands is carried out by the auto-executing tool. If desired, code from the auto-executing tool could be incorporated in the auto-recording tool, and the auto-executing tool could be reserved for routine procedures such as executing (finalized) test files.

Auto-Executing Tool

Figure 7:
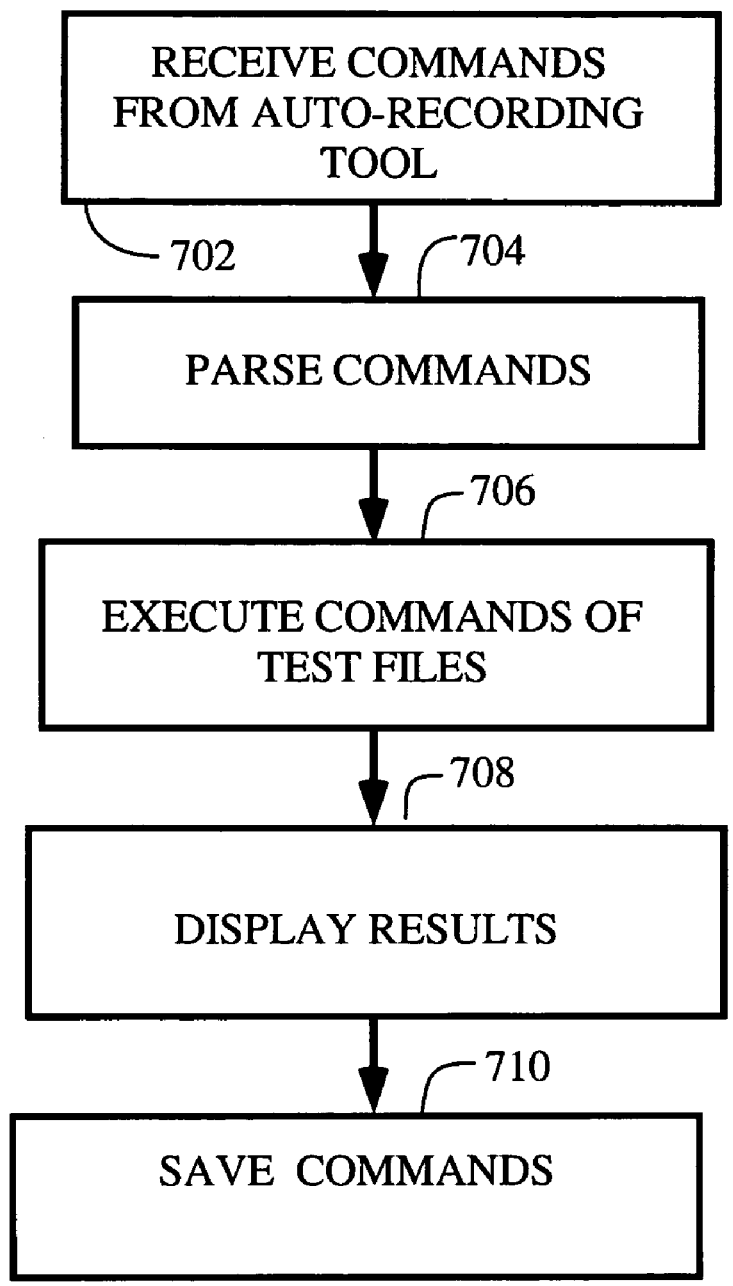
FIG. 7 is an exemplary process flow of evaluating experimental commands in the auto-recording tool of the apparatus of FIG. 1.

The auto-executing tool 142 shown in FIG. 1 can, in one example, be invoked as a standalone tool or, in another example, as a part of the GUI tool 200. The auto-executing tool 142 aids the test developer in a number of ways. In one example, the auto-executing tool 142 is employed to evaluate prospective commands, in the manner set out above with reference to FIG. 4. Referring now to FIG. 7, a user wishes to evaluate a command, and passes the command to the auto-executing tool 142 from the auto-recording tool 141. In step 702 the auto-executing tool receives the command. In step 704 the auto-executing tool prepares the command for execution, which is carried out in step 706. Either as an ongoing step, or when execution is completed, the test results are sent to the auto-recording tool in step 708. Optionally, in one example, the test results can be displayed under control of the auto-executing tool 142. The user then examines the test results to evaluate whether or not the test should be saved in step 710. In one example, saved commands are stored in a test harness file. In another example, the saved commands are stored in a draft file 147 represented in FIG. 1.

Figure 8:
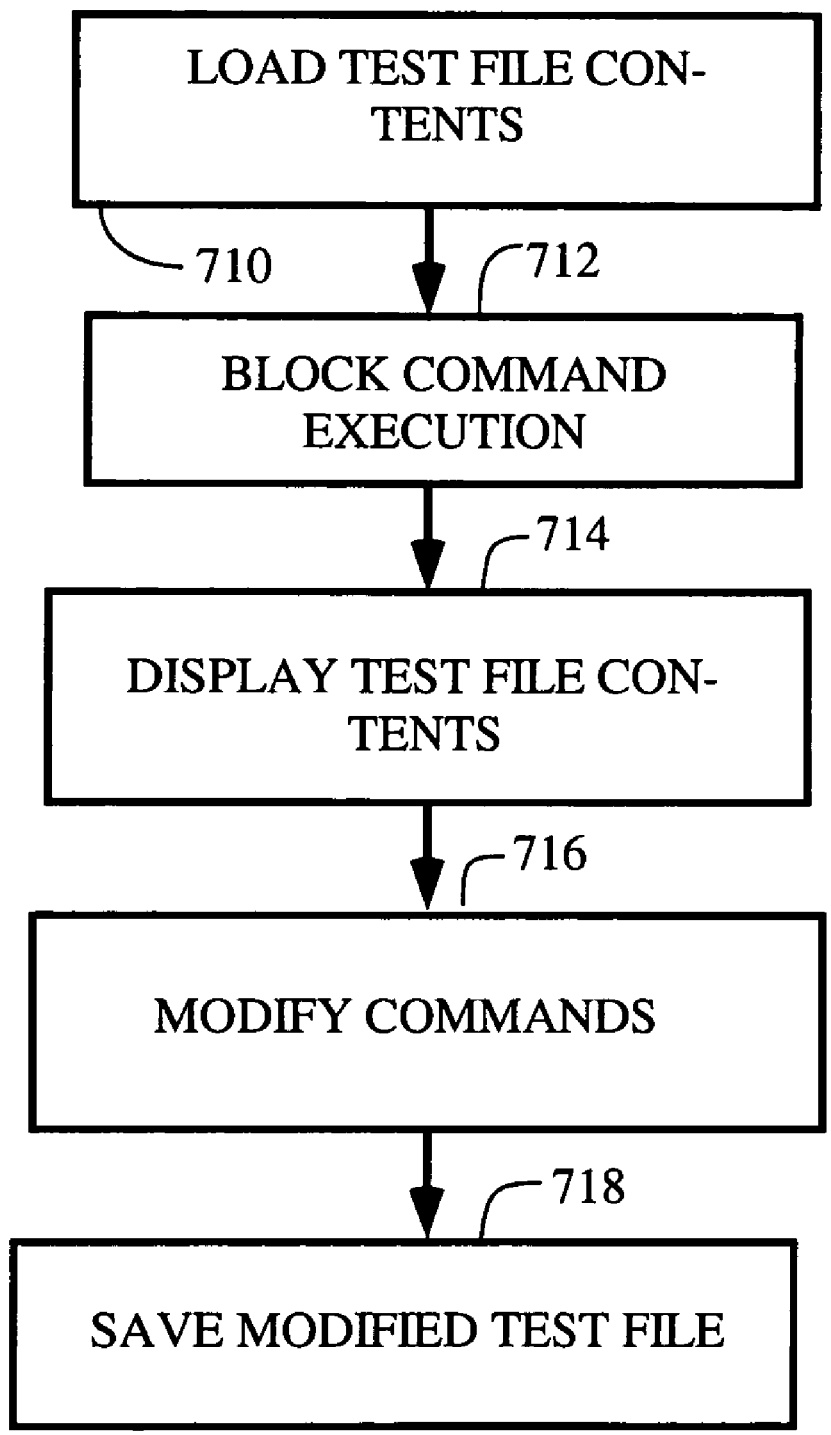
FIG. 8 is an exemplary process flow of editing a test harness file in the auto-executing tool of the apparatus of FIG. 1.

In another example, with reference to FIG. 8, the auto-executing tool 142 can be employed to directly edit a test harness file. In step 710 the contents of the test harness file are loaded into the auto-executing tool 142. According to step 712, execution of the commands are blocked, ignored or otherwise prohibited. In one example, steps can be taken in any known manner to positively prevent command execution by the processor 105 represented in FIG. 1. For example, instructions to execute tests commands can be filtered before being passed to processor 105. In another example, the test button 234 represented in FIG. 2 can be disabled. In step 714 the loaded test file is displayed by auto-executing tool 142. In step 716, some or all of the commands loaded in are modified, and the modified test file is saved in step 718.

In another example, the auto-executing tool is used to read an existing test harness file, and automatically run the statements or automatic regression tests specified therein without user intervention. Optionally, by way of another example, the auto-executing tool can capture the output data, validate the test output, analyze and tabulate the test pass/fail statistics, and record the results. Unlike the auto-recording tool which captures the input data and uses the output data for auto-benchmarking of the test results, the auto-executing tool captures the output data for validation. The auto-executing tool 142 can be used to conveniently modify and to invoke existing commands in older tests to simplify the composition of new tests. According to certain aspects of apparatus 100, only the user input needs to be coded in the test harness file. A user need not be concerned with running separate tests to generate benchmark results, or to normalize or otherwise initialize the test environment. In one example, the auto-executing tool employs an auto-benchmarking technique which is used to capture the output of the tests and to store them in a separate benchmark file. A user normally does not have to be concerned with the benchmark file.

Figure 9:
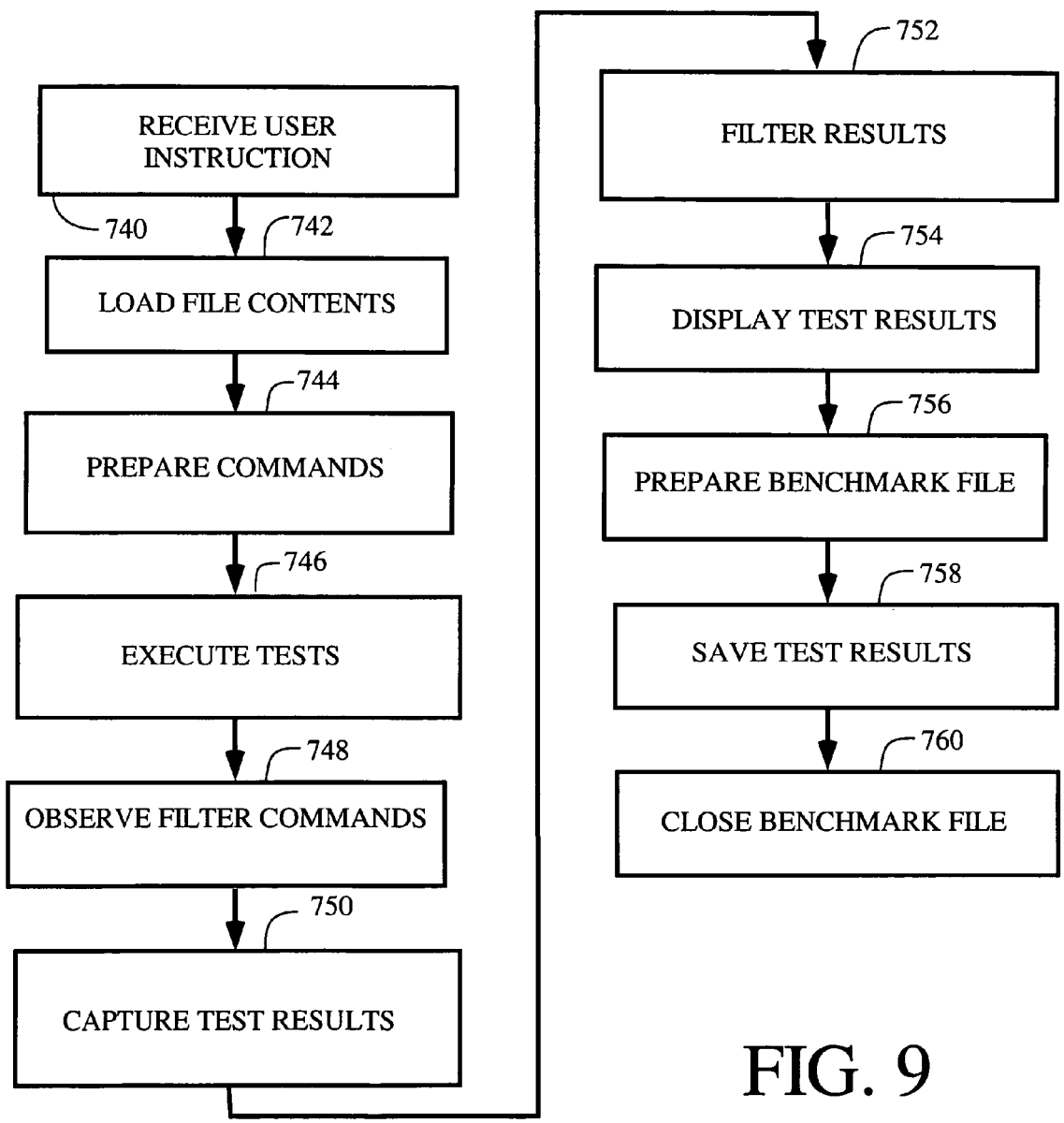
FIG. 9 is an exemplary process flow of generating an auto-benchmark file with the auto-executing tool of the apparatus of FIG. 1.

Referring now to FIG. 9, the auto-executing tool, in another example, is employed to produce an auto-benchmark file such as the file 135 referred to above in the representation of FIG. 1. In step 740 the auto-executing tool 142 receives a user instruction to produce a new auto-benchmark file. In one example, the test harness development system 100 is implemented such that auto-benchmarking is not routinely or automatically invoked, but rather is carried out only upon receipt of a positive indication from the user that auto-benchmarking is desired. In another example, the test harness development system can be implemented in a contrary manner, with auto-benchmarking being automatically performed in appropriate circumstances (e.g. when a test harness file is being executed) unless the user indicates otherwise. In step 742 contents of the test harness file are loaded in the auto-executing tool 142. The commands in the test harness file are expected to be formatted according to the test harness language resource 143. Accordingly, in step 744 the commands are processed or parsed, if necessary, into instructions that are executed in the code of the auto-executing tool. In step 746 the tests of the test harness file are executed in conjunction with step 748 so as to observe filter commands so as to prepare for suppressing unwanted test results of a particular command or group of commands. The test results are captured in step 750 and filtered in step 752. As an optional step, the test results may be displayed to the user in step 754, allowing the user to evaluate, and if satisfactory, allow of the results to be saved, or in the alternative to abort the operation. In one example, the step 754 is not employed and, after preparing a new benchmark file in step 756, the test results are saved in step 758 and the benchmark file is closed in step 760.

If benchmarking is employed, the auto-executing tool can provide the additional functions of validating the test results against the benchmark, tabulating pass/fail statistics, and logging the test results. Pass or failure of a test is usually verified by examining the output. Sometimes a test developer may not be concerned with the entire output, but with only a part of the output. In other situations, verification of the test results may involve running other operating system commands, e.g. to check if some files have been properly generated, or to check if the content of some files has been properly modified. A test developer can quickly compose a new test that is similar to an existing one, via a convenient editing feature (available in both the auto-recording and auto-executing tools) that allows the test developer to invoke any of the steps of the test harness, or to recall, modified execute and then record any of the steps as part of a new test.

A typical test in a harness involves some or no operating system commands to be typed in before actually invoking the software being tested. In one example, these commands may be required to set the appropriate initial environment needed for proper functioning of the software. Examples of such initialization include setting some operating system environment variables, changing to an appropriate directory, or copying certain files to be used in the test.

The information needed for practical execution of a test harness, e.g. initialization settings, is, in one example, recorded in an associated test harness file. Typically, the name of the test harness file describes and uniquely identifies the collection of regression tests, each of which are preferably further named in a unique manner. The test harness information, in one example, is written in the test harness language resource 143 so as to be human-readable (e.g. in plain ascii format, editable by standard editors of known operating systems, such as the UNIX operating system). The test harness language resource 143 emulates the manual test procedure with very little overhead. As a result, the test harness file is simple and easy to understand and easy to modify at a later time, when details of the overall project may be forgotten.

Automatic execution of the tests and test commands or statements of the test harness file 130 on the program 125, in one example, is implemented by cooperation of the auto-executing tool 142 with the processor 105, upon receipt of an executing command argument. The auto-executing tool 142 in one example operates the automatic regression tests on the program 125 to generate one or more results of the program 125, and to display the results to the user 145 (via the interface component 115 or the GUI tool 200 ). The processor 105 retrieves the named test harness 130 from the storage component 101, and then executes the instructions of the test harness 130. The processor 105 executes one or more portions of the auto-executing tool 142. The auto-executing tool 142 obtains a result for the named program 125. The auto-executing tool 142 provides the result of the program 125 to the user 145 through employment of the interface component 115 and/or GUI tool 200. The auto-executing tool 142 obtains a verification of the result of the program 125 from the user 145 through employment of the interface component 115. For example, the auto-executing tool 142 provides a result to the user 145. Preferably, the user 145 compares the result to an expected value and presses an "Accept" button on the GUI tool 200 (not shown) to accept the result.

Figure 10:
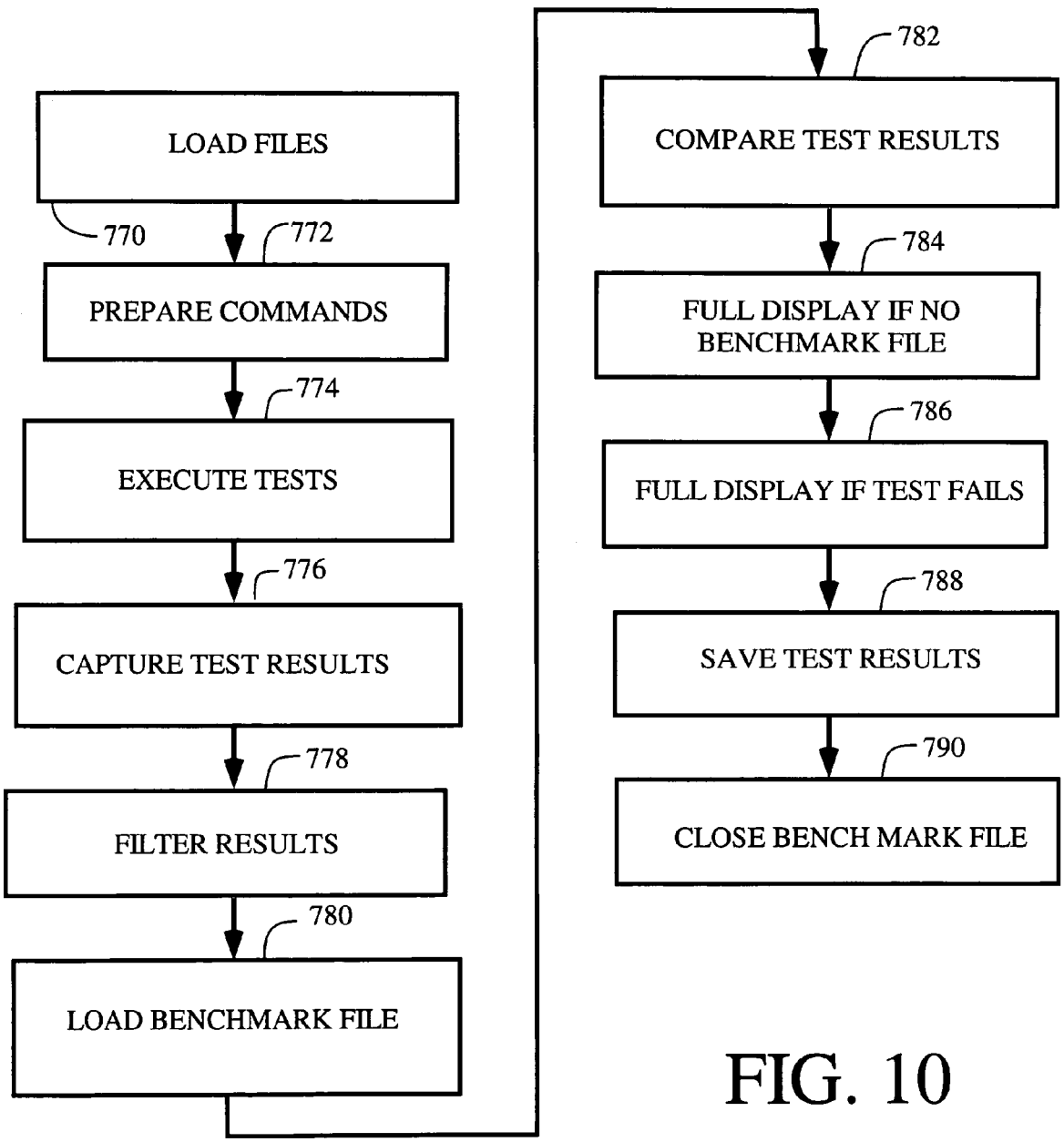
FIG. 10 is an exemplary process flow of validating test results using the auto-executing tool of the apparatus of FIG. 1.

Referring now to FIG. 10, the auto-executing tool 142 is employed to validate test results against a named benchmark file which is associated with the named test harness file. In step 770 the test harness file and the program file to be tested are loaded into the auto-executing tool. In step 772 the commands of the tests in the test harness file are prepared for execution under control of the auto-executing tool code, if necessary. In step 774 the tests of the test harness file are executed and the test results are captured in step 776 and filtered in step 778. In step 780, in one example, the appropriate benchmark file is loaded into the auto-executing tool. In another, more preferable example, the benchmark file is previously associated with the test harness file and is loaded in as part of the execution of the test harness file. In one example, the benchmark file is loaded in as the test harness file is loaded into the auto-executing tool. In another example, the benchmark file is loaded in immediately after the test harness file and, in another example, is loaded in after program instructions are carried out, subsequent to loading of the test harness file. In step 782 the test results are compared to the values stored in the benchmark file. In the optional step 784 the full test results are displayed to the user if no benchmark file is associated with the test harness file. In another optional step 786, the full test results are displayed to the user if a particular test fails. Any further optional step 788, the user is given the opportunity to save the test results in a separate file, for documentation or other purposes. In one preferred example, when a benchmark file is available and all tests pass, execution of step 790 is carried out immediately after step 782 to close the open files, and an indication is forwarded to the user that the validation is successful. If the validation is unsuccessful, as indicated above, the user is, in one example, presented with the full test results, for further analysis.

In another example, if no benchmark file is available to the auto-executing tool, the full test results are displayed to the user for analysis. For example, the user may, upon verification that no benchmark file exists, automatically generate a benchmark file. For example, the auto-executing tool 142 may be employed to cooperate with the processor 105 to automatically generate the benchmark file 135 for the test harness 130 upon receipt of an appropriate command. This can be done by providing auto-benchmarking routines within both the auto-recording tool and the auto-executing tool, or by providing auto-benchmarking routines in the test harness development component 140. This auto-benchmarking, in one example, does not require the results of a previous operation to be known prior to writing the tests in the harness, thus saving the time used to determine such values. Also, this auto-benchmarking does not require the test harness file, or less preferably, the program to include code to define or record such values. Instead, when a test is initially run, the relevant results are displayed on the terminal screen, via interface component 115 and/or GUI tool 200 and it is relatively easy for the user to examine these results to verify whether they correspond to acceptable values, or not.

Figure 13:
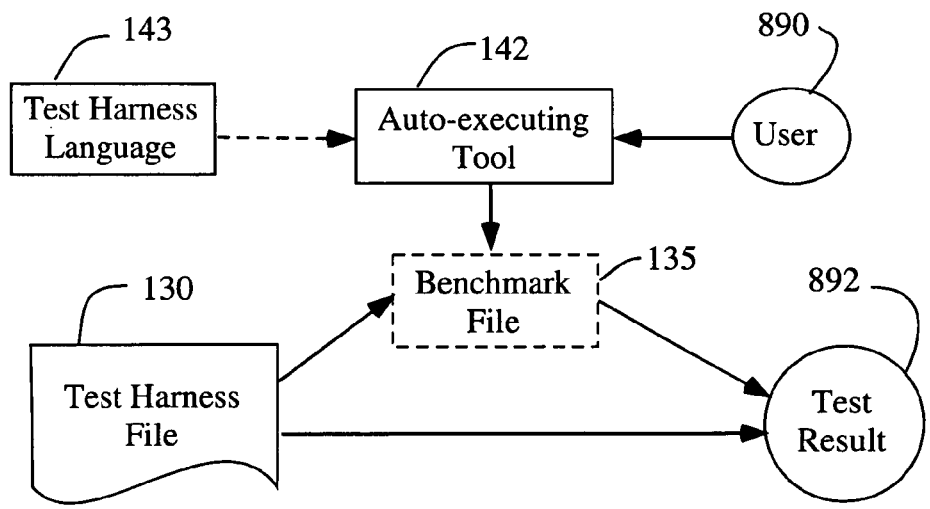
FIG. 13 is an exemplary process flow of the operation of the apparatus of FIG. 1.

This process of auto-benchmarking is reflected in the arrangement represented in FIG. 13, where, under control by a user 890, a test harness file 130 is loaded into auto-executing tool 142 for execution with auto-benchmarking. As an ongoing step, or when execution is completed, the test results 892 are captured, are formatted according to test harness/activity language resource 143, and are saved in a benchmark file 135. Preferably, the name of the benchmark file is automatically assigned by the auto-executing tool to have the same route name as the test harness file.

In one example, benchmark files 135 are generated by the auto-executing tool 142. With reference again to FIG. 1, auto-executing tool 142, in one example, cooperates with the processor 105 to automatically generate the benchmark file 135 for the test harness 130 upon receipt of a benchmark command. The auto-executing tool 142 generates one or more portions of the benchmark file 135 for each test 150 within the test harness 130. In one example, portions of the benchmark file 135 are associated with a test name or other identifier of the test 150, and comprise one or more expected results for the program 125 invoked by the test 150. The auto-executing tool 142 receives the results of the program 125 from the tests 150. The auto-executing tool 142 incorporates the results of the program 125 into the portion of the benchmark file 135 associated with the test name. For example, the user 145 employs the interface component 115 and/or the GUI tool 200 to select one or more tests 150 to benchmark in the test harness 140. The auto-executing tool 142 cooperates with the processor 105 to execute one or more selected tests 150. The auto-executing tool 142 either generates one or more new portions of the benchmark file 135 for the tests 150, or updates the benchmark file by replacing an earlier version of the benchmark file with a current version.

Different versions of the benchmark file 135 can be stored in the draft test harness location 146. In one example, the auto-executing tool 142 generates a first version of the benchmark file 135 at a first executing time and a second version of the benchmark file 135 at a second executing time. If desired, the user 145 may select to employ a previous version of the benchmark file 130, for example, the first version of the benchmark file 135 from the first executing time, for use in regression testing of the program 125. The user 145 in one example performs an interaction with the interface component 115 to select a version of the benchmark file 135 for employment in regression testing of the program 125.

In yet another example, the auto-executing tool 142 generates the benchmark file 135 for the test harness 130 upon receipt of a forcemark command. The auto-executing tool 142 generates the benchmark file 135 for the test harness 130. In one example, the auto-executing tool 142 deletes one or more previous versions of the benchmark file 135 for the test harness 130.

A review of auto-benchmarking as employed in one or more examples of the invention is given with regard to typical exemplar operation of the auto-executing tool. If, upon calling up the designated test harness file and examining the commands in the file, an indicated benchmark file is not present, the tests are run and the test results are displayed in full to the user. A benchmark file will not be created if the user has not requested to do so. If a benchmark file is present, when a named test in the harness is run, the auto-execution tool searches the benchmark file for data marked with the indicated test name. As such data is found, that stored data will be compared with the current output and the pass/fail status will be announced. If the test passes, a brief message is printed. Otherwise, if the test fails the benchmark data and the failed data will both be printed in full. If no data with the indicated test name is found in the benchmark file the full test output will be displayed to the user, and the data for this test will not be added to the benchmark file unless such action has been requested by the user. In one example, the auto-benchmarking code uses a known perl language module called Test::More to run the test harness. Further details concerning the creation, operation, usage and other aspects of auto-benchmarking techniques can be found in co-pending U.S. patent application Ser. No. 10/909,549, entitled "Test Harness Benchmark File", filed Aug. 2, 2004 the disclosure of which is incorporated by reference as if fully set forth herein.

The auto-executing tool 142 in one example employs the benchmark files 135 to perform regression testing on the program 125. The processor 105 executes the test 150 of test harness 130 on the program 125. The auto-executing tool 142 obtains a current result of the auto-executing tool 142. The auto-executing tool 142 employs an identifier of the test 150 to obtain the portion of the benchmark file 135. The auto-executing tool 142 identifies the expected result of the variable within the portion of the benchmark file 135. The auto-executing tool 142 executes the expected result to obtain a result for the current invocation. For example, the auto-executing tool 142 evaluates the textual format of the expected result to obtain an expected result for the current invocation of the test harness 130 for the program 125. The auto-executing tool 142 compares the current result with the expected result for the current invocation.

If, after examination, the user discovers that the value is incorrect, it is possible that there is either a mistake in the test itself or a bug in the software being tested. When all the mistakes have been rectified and the displayed result is satisfactory to the user, the test harness is then invoked with the "benchmark" option set. The software then captures the result of the test as a benchmark and stores that in a file (in a proprietary format understood by the software). In subsequent runs of the same test, the saved benchmark is utilized to verify the correctness of the program. Output from a passing test will no longer contain the output from the program under test, but will be in a terse format.

Occasionally, the existing benchmark of a certain test may become invalidated because either the test has been modified or the software under test has been modified. If this is the case, the test will be flagged by the harness as a failed test (because the new result no longer matches the old benchmark). In the prior art, this would start a process of revising the test in the harness: first working out the exact value of new result, and then replacing the old value coded in the previous version of the test with a new code segment defining the new value. In auto-benchmarking, often no changes to the test harness are needed (unless the individual tests have been modified). By re-executing the test harness again with the benchmark option chosen, the benchmark record will be updated by overwriting the old benchmark with the new test result, and the test can now be conveniently used under the new conditions.

Figure 11:
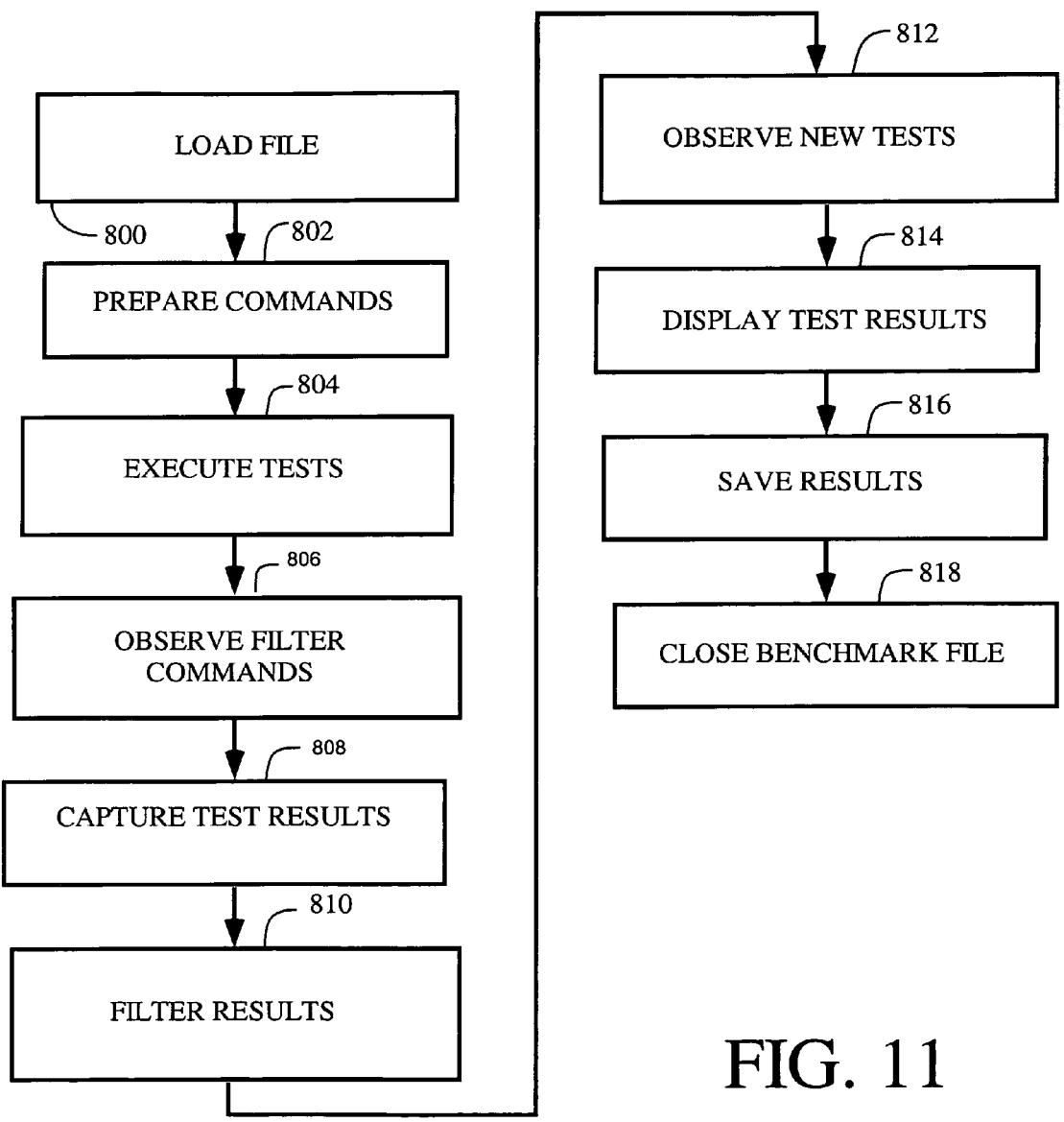
FIG. 11 is an exemplary process flow of updating an existing benchmark file using the auto-executing tool of the apparatus of FIG. 1.

With reference to FIG. 11, an existing benchmark file can be updated in the auto-executing tool 142. In step 800 the contents of a test harness file are loaded into the auto-executing tool. The commands of the tests are parsed or otherwise prepared in step 802 for execution under control of code in the auto-executing tool. The tests are then executed in step 804 and preparation is made to observe filter commands in step 806. The test results are then captured in step 808, and filtered in step 810. It is assumed that less than all of the tests of the benchmark file are to be updated. In one example, in step 804 the auto-executing tool responds to appropriate commands to carry out a particular test with auto benchmarking. Accordingly, in step 812 results of the "new" tests are observed, and are process in further steps for evaluation by the user. In another example, the entire benchmark file may be replaced automatically with results of all tests carried out. In a further example, the entire benchmark file may be replaced, but the results of the "new" tests are displayed to the user for evaluation. In yet another example, according to step 814, all of the test results are displayed to the user, with full results being displayed for "new" tests. In step 816 the test results are saved under an old or a new benchmark filename. In step 818 the benchmark file is closed.

In one example, the auto-executing tool comprises a program written in perl using the publicly available Expect module and the Test::More module. The Expect module provides functions to emulate a user's input and to capture computer output in exactly the same way as if the commands have been typed on a terminal. After sending the user's input, an Expect utility function can be called to capture the subsequent output and look for the presence of a string that matches one of a specified set of patterns. If the string is found, the program can then proceed with the next appropriate action according to the matched pattern. The Test::More module provides functions to compare the values of two values and report the result as the pass/failure status of a test, and also to tabulate the statistics of all test results. The tool also uses the ModTest module, to implement benchmarking for the tests.

Figure 12:
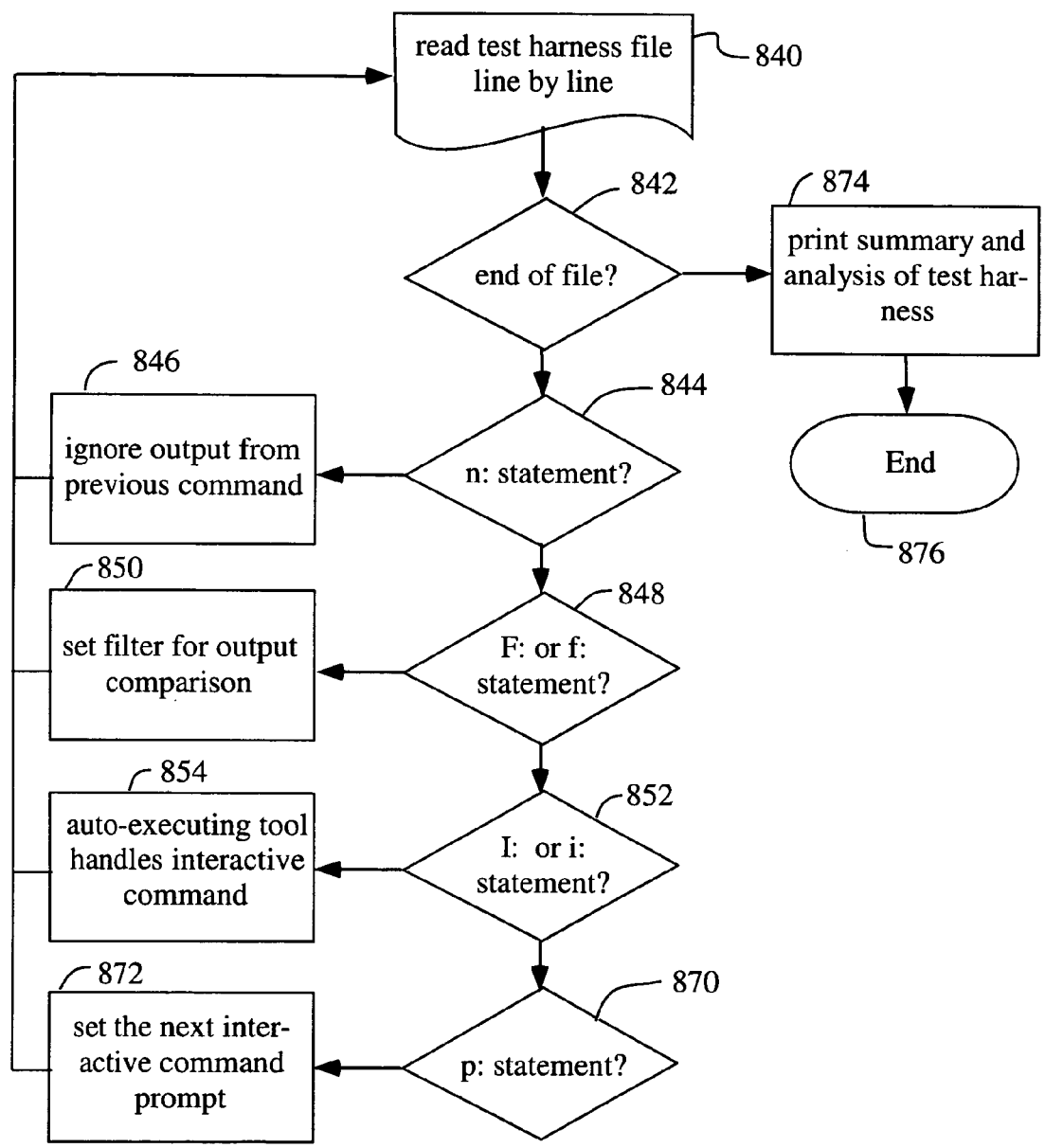
FIG. 12 is an exemplary process flow of interpreting a test harness file using the auto-executing tool of the apparatus of FIG. 1.

Turning now to FIG. 12, a test harness file is interpreted by the Auto-Executing tool. In step 840, the auto-executing tool 142 reads the test harness file line by line, until an end of file is detected in step 842. If the line is a comment, it is ignored, unless it is a line that marks either the beginning or the end of a test, and the next line is processed, by passing execution to the next step 844. The beginning-test and end-test marks are used by the auto-executing tool to select specified tests. If the line is a non-interactive command, the command is executed as if typed in by the test developer. The output is captured and saved.

Referring to step 844, if the next line is an n: statement, execution is passed to step 846 were the captured output is ignored and the next line is processed in step 840. If the next line is an N: statement, the specified test name will be used to refer to the test. If the next line is another command (interactive or not), the default test verification will be used for the previous command, namely, that the captured output will be matched against the benchmark. The program then uses a ModTest utility to search for a benchmark associated with the test (which is uniquely identified by the test name) in the benchmark file. If a benchmark file exists, its contents is compared with the output (see the next section concerning filtering) and a Test::More utility is called to report the result. If a benchmark does not exist, the output is simply printed.

Referring to step 848, if the next line is an f: statement or if a default filter has been specified by an earlier F: command, both the benchmark and the output will be filtered first before the comparison is made. Execution is returned to step 840 through step 850 in which the filter is set for output comparison.

Referring now has to step 852, if the next line is an I: or i: statement, the Expect module is used to simulate a user input and wait for the appropriate prompt 854. The difference between the two types of statements is that an I: statement starts an Expect session and some additional initialization procedures need to be done first, while an i: statement continues with an existing Expect session. In fact, if an I: statement is encountered when a previous Expect session has not been closed, that indicates a failure of the previous test. Output from an I: or i: statement is always tested.

Referring now to step 870, if the next line is a p: statement, the prompt pattern specified will be used for subsequent Expect sessions. Control is returned to step 840 through step 872 which sets the next interactive command prompt.

Processing of statements stops when the end of the file is reached. Execution is then transferred to step 874 in which a summary and analysis of the test harness is printed, with execution ending at step 876.

In one example, the test harness may be executed in a standalone mode, apart from the GUI tool 200. As described above, with regard to the representation of FIG. 1, when the Test button 240 in the GUI tool 200 is clicked, and the test harness is auto-executed.

Alternatively, the test harness can be run directly using a command at the operating system prompt. The following is an example, using the UNIX operating system:

```
aetest TEST_HARNESS_FILE
aetest -b TEST_HARNESS_FILE
```

The -b option invokes benchmarking. If a test passes, the output is very terse. If a test fails, detailed output containing the result from the test command and the expected result are displayed. By way of example, a typical result from running a simple test harness that has been benchmarked is given as:

```
ok 1 - test_name 1
ok 2 - test_name 2
ok 3 - test_name 3
not ok 4 - test_name 4
# Failed test
# got: 'test text line 0
# line 2
#'
# expected: 'test text line 1
# line 2
#'
1..4
# Looks like you failed 1 test of 4.
```

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the storage component 101. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

As will now be appreciated, the present invention in certain aspects provides a number of improvements in the art of developing testing for software projects. By way of example and not limitation, a number of advantages will now be described. For example, the auto-recording tool, the auto-executing tool, the test harness language and the GUI tool are applicable to any text-based (non-graphical), interactive or non-interactive software and does not require a model to exist first. The Auto-Recording tool is provided to simplify the initial development of the test harness. This essentially eliminates the need to write codes for test harnesses. The Auto-Executing tool is provided to run or update an existing test harness. The GUI tool is provided to facilitate the development of test harnesses. It can now be seen that the new test harness language provides advantages for composing test harnesses in a very simple format. Further examples of improvements are found in the use of filtering to enhance the flexibility and power of the test verification capabilities of the auto-executing tool. The use of incremental benchmarking eliminates the need to code the test verification step into a test harness. This greatly simplifies the content of a test harness and speeds up the process needed to modify and expand an existing test harness. The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:

defining and writing a series of statements comprising a test harness file for the automated regression testing of non-graphical software;

one of the series of statements comprising requesting text string data representing a user-given name for a test in the test harness file;

one of the series of statements comprising entering text string data representing test data of the non-graphical software;

one of the series of statements comprising a non-interactive operating system command comprising a test of the test harness file;

one of the series of statements comprising an interactive operating system command used as a test of the test harness file followed by a prompt pattern used by the interactive operating system command;

one of the series of statements comprising user input within the interactive operating system command;

one of the series of statements comprising a definition of a one-time filter statement that alters the output of only a preceding command and reverts to a default filter for filtering subsequent commands; and comparing the altered output of the preceding command to a benchmark value.

2. The method of claim 1 wherein the test harness file comprises a plurality of tests, one after the other, delineated by user-given names for the tests.

3. The method of claim 1 wherein the user-given name is responsive to a call for a name in a preceding statement.

4. The method of claim 1 wherein a statement in the series of statements comprises either a non-interactive operating system command or an interactive operating system command, and the statement indicates that the output of an command is to be discarded.

5. The method of claim 1 wherein one of the series of statements comprises either a non-interactive operating system command or an interactive operating system command, and the one of the series of statements indicates that an output of the command is to be compared to determine if the command passes or not.

6. The method of claim 1 wherein one of the series of statements comprises a definition of a filter statement that alters an output of a preceding statement.

7. The method of claim 6 wherein the filter statement comprises a default filter statement used throughout the remainder of the test.

8. The method of claim 6 further comprising the step of comparing output of a preceding command to a benchmark value to subsequent matching to determine if the preceding command passes and wherein the filter statement specifies a portion of the output of the preceding command to be suppressed.

9. The method of claim 8 wherein the filter statement specifies a time stamp generated by the preceding command.

10. The method of claim 8 wherein the filter statement specifies the presence or absence of a key word amongst the output generated by the preceding command.

11. The method of claim 6 further comprising the step of comparing output data of a preceding command to a benchmark value to subsequent matching to determine if the preceding command passes or not and wherein the filter statement is used to filter the output of the preceding statement and the benchmark value.

12. The method of claim 1 wherein one of the series of statements comprises a comment line containing text specified by a user.

13. The method of claim 1 wherein the operating system command comprises a command in the native operating system.

14. A method, comprising the steps of:
defining and writing a series of statements comprising a test harness file for the automated regression testing of non-graphical software;
one of the series of statements comprising requesting text string data representing a user-given name for a test in the test harness file;
one of the series of statements comprising entering text string data representing test data of the non-graphical software;
one of the series of statements comprising a non-interactive operating system command comprising a test of the test harness file;
one of the series of statements comprising an interactive operating system command used as a test of the test harness file followed by a prompt pattern used by the interactive operating system command;
one of the series of statements comprising user input within the interactive operating system command;
one of the series of statements comprising a definition of a one-time filter statement that alters the output of only a preceding command and reverts to a default filter for filtering subsequent commands; and
comparing the altered output of the preceding command to a benchmark value.

15. The method of claim 14 wherein the filter statement indicates a portion of the output of a preceding command which is to be discarded.

16. The method of claim 14 wherein the filter statement comprises a that the default filter statement used throughout the remainder of the test.

17. The method of claim 16 wherein the one of the series of statements comprises a definition of a one-time filter statement that alters the output only of a preceding statement, with the remainder of the test being carried out using the default filter.

18. The method of claim 14 wherein the filter statement specifies the presence or absence of a key word amongst the output generated by the preceding command.

19. The method of claim 14 further comprising the step of comparing output data of a preceding command to a benchmark value to subsequent matching to determine if the preceding command passes or not and wherein the filter statement is used to filter the output of the preceding statement and the benchmark value.

20. A method, comprising the steps of:
defining and writing a series of statements comprising a test harness file for the automated regression testing of non-graphical software;
one of the series of statements comprising requesting text string data representing a user-given name for a test in the test harness file;
one of the series of statements comprising entering text string data representing test data of the non-graphical software;
one of the series of statements comprising a non-interactive operating system command comprising a test of the test harness file;
one of the series of statements comprising an interactive operating system command used as a test of the test harness file followed by a prompt pattern used by the interactive operating system command;
one of the series of statements comprising user input within the interactive operating system command;
one of the series of statements comprising a definition of a one-time filter statement that alters the output of only a preceding command and reverts to a default filter for filtering subsequent commands; and
comparing the altered output of the preceding command to a benchmark value.

21. The method of claim 20 wherein the filter statement specifies the presence or absence of a key word amongst the output generated by the preceding command.

22. The method of claim 20 wherein the filter statement comprises a default filter statement used throughout the remainder of the test.

* * * * *